US012789776B2

(12) United States Patent
Lee

(10) Patent No.: US 12,789,776 B2
(45) Date of Patent: Nov. 10, 2026

(54) BRAKE APPARATUS AND METHOD OF CONTROLLING THE SAME

(71) Applicant: HL MANDO CORPORATION, Gyeonggi-do (KR)

(72) Inventor: Changwoo Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 60 days.

(21) Appl. No.: 18/777,498

(22) Filed: Jul. 18, 2024

(65) Prior Publication Data

US 2025/0100524 A1 Mar. 27, 2025

(30) Foreign Application Priority Data

Sep. 22, 2023 (KR) ........................ 10-2023-0127188

(51) Int. Cl.
*B60T 13/66* (2006.01)
*B60T 13/74* (2006.01)

(52) U.S. Cl.
CPC .......... *B60T 13/662* (2013.01); *B60T 13/745* (2013.01); *B60T 2220/04* (2013.01)

(58) Field of Classification Search
CPC .. B60T 13/662; B60T 13/745; B60T 2220/04; B60T 7/042; B60T 13/686; B60T 17/22; B60T 17/222; B60T 13/148; B60T 2250/03; B60T 2250/04; B60T 2270/402; B60Y 2306/13; B60Y 2400/81
See application file for complete search history.

(56) References Cited

U.S. PATENT DOCUMENTS

2012/0200058 A1 8/2012 Sekiya et al.

FOREIGN PATENT DOCUMENTS

JP 6747282 8/2020
KR 10-2015-0128784 11/2015
WO WO-2020204510 A1 * 10/2020 ............ B60T 13/145

* cited by examiner

*Primary Examiner* — Lindsay M Low
*Assistant Examiner* — Charles J Brauch
(74) *Attorney, Agent, or Firm* — WOMBLE BOND DICKINSON (US) LLP

(57) ABSTRACT

Disclosed herein is a brake apparatus including a first hydraulic pressure supplier connected to a wheel cylinder of a vehicle, a second hydraulic pressure supplier connected to the wheel cylinder, a first controller configured to control the first hydraulic pressure supplier to provide a first hydraulic pressure to the wheel cylinder, and a second controller configured to control the second hydraulic pressure supplier to provide a second hydraulic pressure to the wheel cylinder, wherein the first controller is configured to connect to a first power source of the vehicle and a first pedal sensor of the vehicle, and the second controller is configured to connect to a second power source of the vehicle, the first pedal sensor, and a second pedal sensor of the vehicle and includes a power source monitoring unit configured to monitor whether a current is supplied from the first controller to the first pedal sensor.

19 Claims, 9 Drawing Sheets

BRAKE APPARATUS AND METHOD OF CONTROLLING THE SAME

CROSS-REFERENCE TO RELATED APPLICATION

This application claims the priority to and benefit of Korean Patent Application No. 10-2023-0127188, filed on Sep. 22, 2023 in the Korean Intellectual Property Office, the disclosure of which is incorporated herein by reference herein in its entirety.

BACKGROUND

1. Field

Embodiments of the present disclosure generally relate to an electrohydraulic brake apparatus and a method of controlling the same.

2. Description of the Related Art

A brake apparatus for performing braking is necessarily mounted on a vehicle, and the brake apparatus for braking a vehicle in various ways for the safety of a driver and passengers has been proposed.

Recently, an electronic brake system including a cylinder-piston type hydraulic pressure supply device for receiving an electrical signal for a driver's brake intention and supplying a hydraulic pressure necessary for braking to wheel cylinders when the driver steps on a brake pedal has become widely used.

Furthermore, an electronic brake system which further includes an auxiliary supply device used for a failure of an electrically controlled hydraulic pressure supply device (e.g., a failure of an electronic control unit (ECU), failure of a motor, or power supply cutoff) is being developed.

The hydraulic pressure supply devices and the auxiliary supply device may acquire detection information from each of a plurality of sensors and perform a braking operation of a vehicle based on the acquired detection information.

However, when the detection information provided to the hydraulic pressure supply device cannot be checked due to a failure of the hydraulic pressure supply device, it is difficult to perform the braking operation of the vehicle by the auxiliary supply device.

Therefore, there is a need for a brake apparatus which may stably acquire the detection information from each of the plurality of sensors in the auxiliary supply device used for a failure of the hydraulic pressure supply device, and a method of controlling the same.

SUMMARY

Therefore, it is an aspect of the present disclosure to provide a brake apparatus including an auxiliary supply device, which is capable of stably acquiring a plurality of pieces of detection information from a plurality of sensors and used for a failure of a hydraulic pressure supply device, and a method of controlling the same.

Additional aspects of the disclosure will be set forth in part in the description which follows and, in part, will be obvious from the description, or may be learned by practice of the disclosure.

In accordance with one aspect of the present disclosure, a brake apparatus includes a first hydraulic pressure supplier connected to one or more of wheel cylinders of a vehicle, a second hydraulic pressure supplier connected to one or more of the wheel cylinders, a first controller configured to control the first hydraulic pressure supplier to supply a first hydraulic pressure to one or more of the wheel cylinders and a second controller configured to control the second hydraulic pressure supplier to supply a second hydraulic pressure to one or more of the wheel cylinders, wherein: the first controller is configured to connect a first power source of the vehicle with a first pedal sensor of the vehicle, the second controller is configured to connect a second power source of the vehicle with the first pedal sensor and a second pedal sensor of the vehicle, and monitor a first current supplied from the first power source to the first pedal sensor, and the second controller is configured to, in response to detecting that the first current from the first power source is not supplied to the first pedal sensor, supply a second current of the second power source to the first pedal sensor and receive a first pedal signal and a second pedal signal from the first pedal sensor and the second pedal sensor, respectively.

The first controller may include a first switch configured to selectively allow or block the first current of the first power source to be supplied to the first pedal sensor, a second switch configured to selectively allow or block the first pedal signal to be received from the first pedal sensor, and a first processor configured to control at least one of the first switch or the second switch.

The second controller may include a third switch configured to selectively allow or block the second current of the second power source to be supplied to the first pedal sensor, a fourth switch configured to selectively allow or block the first pedal signal to be received from the first pedal sensor, and a second processor configured to control at least one of the third switch or the fourth switch.

The third switch may be connected to a power source terminal of the first pedal sensor in series between the first controller and the second controller.

The fourth switch may be connected to a signal terminal of the first pedal sensor in series between the first controller and the second controller.

The second processor may be configured to control the third switch in response to a signal indicating whether the first current from the first power source is supplied to the first pedal sensor.

The second processor may be configured to, in response to the signal indicating that the first current from the first power source is not supplied to the first pedal sensor, control the third switch such that the second current is supplied from the second power source to the first pedal sensor.

The second processor may be configured to control the fourth switch to selectively allow the first pedal signal to be received from the first pedal sensor.

The power source monitoring unit may include a first power source monitor configured to monitor whether the first current is supplied from the first power source and a second power source monitor configured to monitor whether the first current is supplied to the first pedal sensor.

The second processor may be configured to, in response to a monitoring result that the first current is not supplied from the first power source to the first pedal sensor, determine that the first power source fails.

The second processor may be configured to, in response to a monitoring result that the first current is supplied from the first power source and the first current is not supplied to the first pedal sensor, determine that the first processor fails.

The first controller may further include a first mode switch configured to transmit a frequency toggle signal which toggles at a predetermined frequency.

The second controller may further include a second mode switch configured to receive the frequency toggle signal.

The second processor may be configured to, when the frequency toggle signal transmitted from the first mode switch to the second mode switch has a different frequency from the predetermined frequency, determine that the first controller fails.

The first controller may further include a first communicator connected to a vehicle communication network.

The second controller may further include a second communicator connected to the vehicle communication network.

The second processor may be configured to, in response to reception of data indicating a failure of the first controller from the first controller through the second communicator, determine the failure of the first controller.

The second processor may be configured to determine whether at least one of the first pedal sensor or the second pedal sensor fails based on the first pedal signal and the second pedal signal.

The second processor may be configured to, when the first pedal signal is different from the second pedal signal, determine that at least one of the first pedal sensor or the second pedal sensor fails.

The second processor may be configured to determine that the first pedal sensor fails when the first pedal signal includes information indicating a failed state of the first pedal sensor, and determine that the second pedal sensor fails when the second pedal signal includes information indicating a failed state of the second pedal sensor.

The vehicle may further include a plurality of sensors, and the plurality of sensors may include one or more of a vehicle speed sensor configured to detect a longitudinal speed of the vehicle, an acceleration sensor configured to detect longitudinal and transverse accelerations of the vehicle, a gyro sensor configured to detect a yaw rate, a roll rate, and a pitch rate of the vehicle, or a wheel sensor configured to detect a wheel speed and a wheel direction of the vehicle.

The second processor may be configured to determine that any one of the first pedal sensor or the second pedal sensor is normal based on detected values detected by the plurality of sensors.

The second processor may be configured to, when any one of the first pedal sensor or the second pedal sensor fails, transmit a notification signal for safety control of the vehicle to a driving assistance system of the vehicle so that the driving assistance system of the vehicle safely controls the vehicle.

The second processor may be configured to, when one of the first pedal sensor or the second pedal sensor fails, control a brake operation of the vehicle based on a pedal signal provided from another of the first pedal sensor or the second pedal sensor which does not fail.

In accordance with another aspect of the present disclosure, a method of controlling a brake apparatus includes monitoring whether a first current from a first power source of a vehicle is supplied to the first pedal sensor to which a first controller is connected, when the first current from the first power source is not supplied to the first pedal sensor, supplying a second current of a second power source of the vehicle from the second power source and a second controller connected to a second pedal sensor to the first pedal sensor, receiving a first pedal signal from the first pedal sensor; and receiving a second pedal signal from the second pedal sensor.

The controlling method may include determining whether the received first pedal signal is different from the received second pedal signal, when the first pedal signal is different from the second pedal signal, transmitting a notification signal for safety control of the vehicle to a driving assistance system of the vehicle when the first pedal signal is different from the second pedal signal and when the first pedal signal is identical to the second pedal signal, performing a brake operation of the vehicle based on the first pedal signal and the second pedal signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms “unit,” “module,” “member,” and “block” used in the specification may be implemented as software or hardware, and according to the embodiments, a plurality of “units,” “modules,” “members,” and “blocks” may be implemented as one component, or one “unit,” “module,” “member,” and “block” may also include a plurality of components.

Throughout the specification, when a first component is described as being “connected” to a second component, this includes not only a case in which the first component is directly connected to the second component but also a case in which the first component is indirectly connected to the second component, and the indirect connection includes connection through a wireless communication network.

In addition, when a certain portion is described as “including” a certain component, this means further including other components rather than precluding other components unless especially stated otherwise.

Throughout the specification, when a first member is described as being positioned “on” a second member, this includes both a case in which the first member is in contact with the second member and a case in which a third member is present between the two members.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

Figure 1:
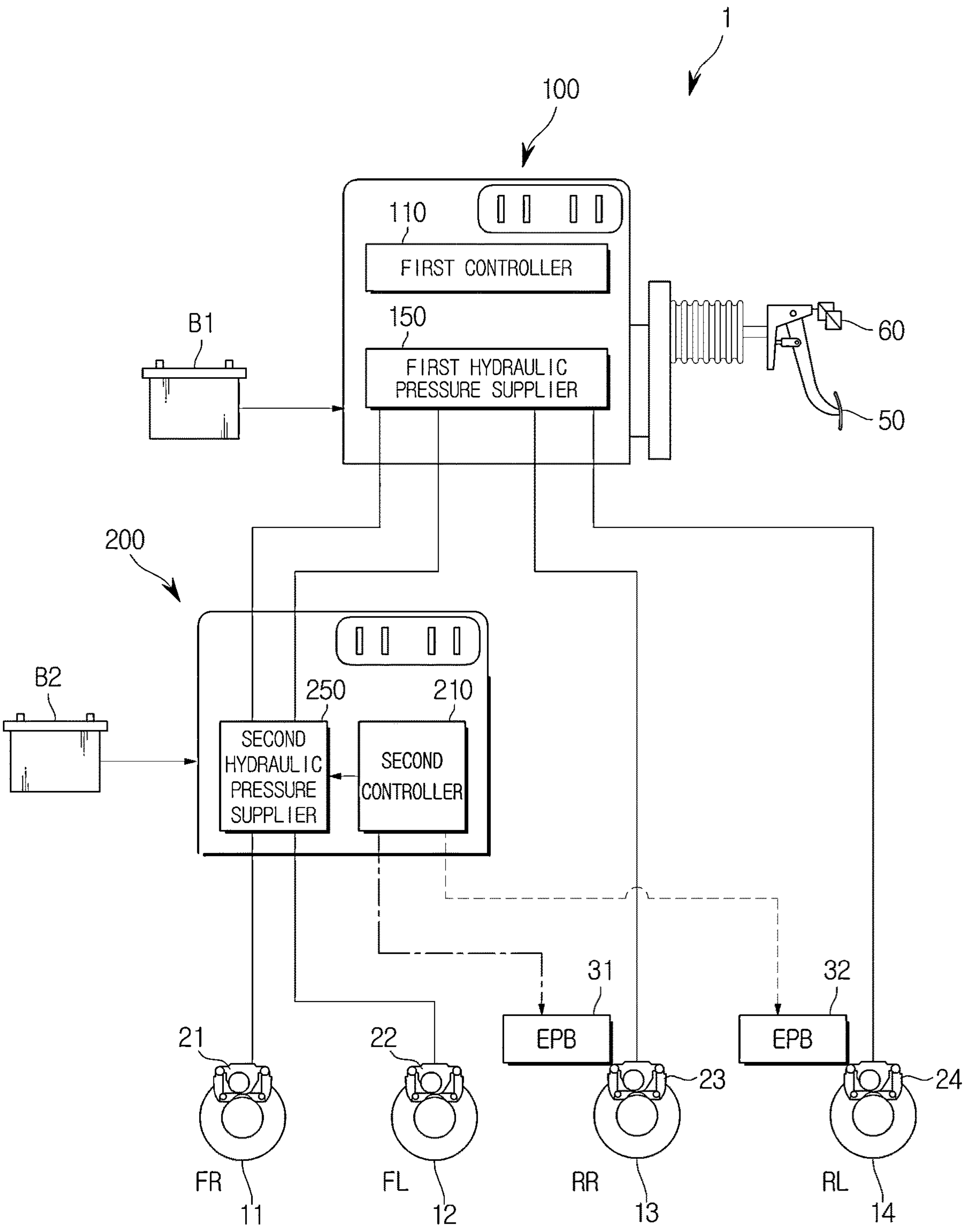
FIG. 1 illustrates a configuration of a vehicle according to one embodiment.

FIG. 1 illustrates a configuration of a vehicle according to one embodiment.

A vehicle 1 may include a body forming an exterior thereof and accommodating a driver and/or luggage, a chassis including components of the vehicle 1 other than the body, and wheels 11, 12, 13, and 14 that rotate to move the vehicle 1.

As illustrated in FIG. 1, the wheels 11, 12, 13, and 14 may include, for example, the first wheel 11 provided at a front right side of the vehicle 1, the second wheel 12 provided at a front left side of the vehicle 1, the third wheel 13 provided at a rear right side of the vehicle 1, and/or the fourth wheel 14 provided at a rear left side of the vehicle 1. The number of wheels 11, 12, 13, and 14 is not limited to four.

Each of the wheels 11, 12, 13, and 14 may be provided with a disk coupled to each of the wheels 11, 12, 13, and 14 to rotate together with the wheels 11, 12, 13, and 14. In addition, each of the wheels 11, 12, 13, and 14 may be provided with a brake caliper for interfering rotation of the disk using friction. The rotation of the wheels 11, 12, 13, and 14 and the disk may be stopped by friction between a brake pad included in the brake caliper and the disk.

The brake caliper may be provided with wheel cylinders 21, 22, 23, and 24 for accommodating a pressing medium such as a brake oil and moving the brake pad so that the brake pad presses the disk using a pressure (hereinafter, "hydraulic pressure") of the pressing medium.

The wheel cylinders 21, 22, 23, and 24 may include, for example, the first wheel cylinder 21 installed on the first wheel 11, the second wheel cylinder 22 installed on the second wheel 12, the third wheel cylinder 23 installed on the third wheel 13, and the fourth wheel cylinder 24 installed on the fourth wheel 14. The number of wheel cylinders 21, 22, 23, and 24 is not limited to four.

The brake caliper may be provided with parking brakes 31 and 32 for moving the brake pad so that the brake pad presses the disk using an electro-mechanical force without hydraulic pressure. For example, the brake calipers associated with the third wheel 13 and the fourth wheel 14 provided at a rear of the vehicle may be provided with a first parking brake 31 and a second parking brake 32, respectively.

Each of the first and second parking brakes 31 and 32 may include, for example, a motor with a rotational shaft and a spindle linearly moved by the rotation of the rotational shaft. The brake pad may be moved linearly by the linear movement of the spindle to press the disk.

Each of the first and second parking brakes 31 and 32 may move the brake pad toward the disk in response to an engagement signal. In addition, each of the first and second parking brakes 31 and 32 may separate the brake pad from the brake disk in response to a disengagement signal.

In addition, the vehicle 1 may further include a brake pedal 50 for acquiring the driver's brake intention, and a first hydraulic pressure supply device 100 and a second hydraulic pressure supply device 200 for providing a press medium to the wheel cylinders 21, 22, 23, and 24 in order to brake the wheels 11, 12, 13, and 14.

The first hydraulic pressure supply device 100 may generate a pressure (hereinafter referred to as "hydraulic pressure") of the pressing medium for braking the wheels 11, 12, 13, and 14. The first hydraulic pressure supply device 100 may generate a hydraulic pressure based on the driver's brake intention acquired through the brake pedal 50 and distribute the generated hydraulic pressure to the wheel cylinders 21, 22, 23, and 24. An internal pressure of each of the wheel cylinders 21, 22, 23, and 24 may depend on the hydraulic pressure provided from the first hydraulic pressure supply device 100. The wheels 11, 12, 13, and 14 may each be braked depending on the internal pressures of the wheel cylinders 21, 22, 23, and 24.

The first hydraulic pressure supply device 100 may include a first hydraulic pressure supplier 150 for providing the hydraulic pressure to the wheel cylinders 21, 22, 23, and 24, and a first controller 110 for controlling the first hydraulic pressure supplier 150. The first controller 110 may control the first hydraulic pressure supplier 150 to provide and/or distribute the hydraulic pressure to the wheel cylinders 21, 22, 23, and 24 based on the driver's brake intention acquired through the brake pedal 50.

The second hydraulic pressure supply device 200 may be provided on a connection flow path connecting the first hydraulic pressure supply device 100 to some of the wheel cylinders 21, 22, 23, and 24 and generate hydraulic pressures for braking the wheels 11, 12, 13, and 14. For example, as illustrated in FIG. 1, the second hydraulic pressure supply device 200 may be provided on a connection flow path connecting the first hydraulic pressure supply device 100 to the first and second wheel cylinders 21 and 22 and generate the hydraulic pressure for braking the first and second wheels 11 and 12.

The second hydraulic pressure supply device 200 may be preliminarily or dually provided with respect to the first hydraulic pressure supply device 100. For example, the second hydraulic pressure supply device 200 may be deactivated during a normal operation of the first hydraulic pressure supply device 100. In addition, the second hydraulic pressure supply device 200 may generate the hydraulic pressure on behalf of the first hydraulic pressure supply device 100 when the power being supplied to the first hydraulic pressure supply device 100 is cut off or the first hydraulic pressure supply device 100 fails.

The second hydraulic pressure supply device 200 may generate the hydraulic pressure based on the driver's brake intention acquired through the brake pedal 50 and distribute the generated hydraulic pressure to some of the wheel cylinders 21, 22, 23, and 24. For example, the second hydraulic pressure supply device 200 may provide the hydraulic pressure to the first and second wheel cylinders 21 and 22.

The second hydraulic pressure supply device 200 may include a second hydraulic pressure supplier 250 for providing the hydraulic pressure to the first and second wheel cylinders 21 and 22, and a second controller 210 for controlling the second hydraulic pressure supplier 250. The second controller 210 may control the second hydraulic pressure supplier 250 to provide and/or distribute the hydraulic pressure to the wheel cylinders 21, 22, 23, and 24 based on the driver's brake intention acquired through the brake pedal 50.

The second hydraulic pressure supply device 200 may receive power from a power network which differs from that of the first hydraulic pressure supply device 100. For example, the second hydraulic pressure supply device 200 may receive power from a power source which differs from that of the first hydraulic pressure supply device 100. As illustrated in FIG. 1, the first hydraulic pressure supply device 100 may receive power from a first battery B1, and the second hydraulic pressure supply device 200 may receive power from a second battery B2 which differs from the first battery B1. As another example, the second hydraulic pressure supply device 200 may receive the power from the power network which differs from that of the first hydraulic pressure supply device 100. The first hydraulic pressure supply device 100 may receive the power from a first power network, and the second hydraulic pressure supply device 200 may receive the power from a second power network which differs from that of the first power network.

As described above, the first hydraulic pressure supply device 100 may supply the hydraulic pressure to all of the first, second, third, and fourth wheel cylinders 21, 22, 23 and 24 to brake the first, second, third, and fourth wheels 11, 12, 13, and 14. The second hydraulic pressure supply device 200 may supply the hydraulic pressure to the first and second wheel cylinders 21 and 22 to brake the first and second wheels 11 and 12. The first and second parking brakes 31 and 32 may brake the third and fourth wheels 13 and 14, respectively.

As described above, the second hydraulic pressure supply device 200 and the parking brakes 31 and 32 may be preliminarily or dually provided to be used for the failure of the first hydraulic pressure supply device 100.

Figure 2:
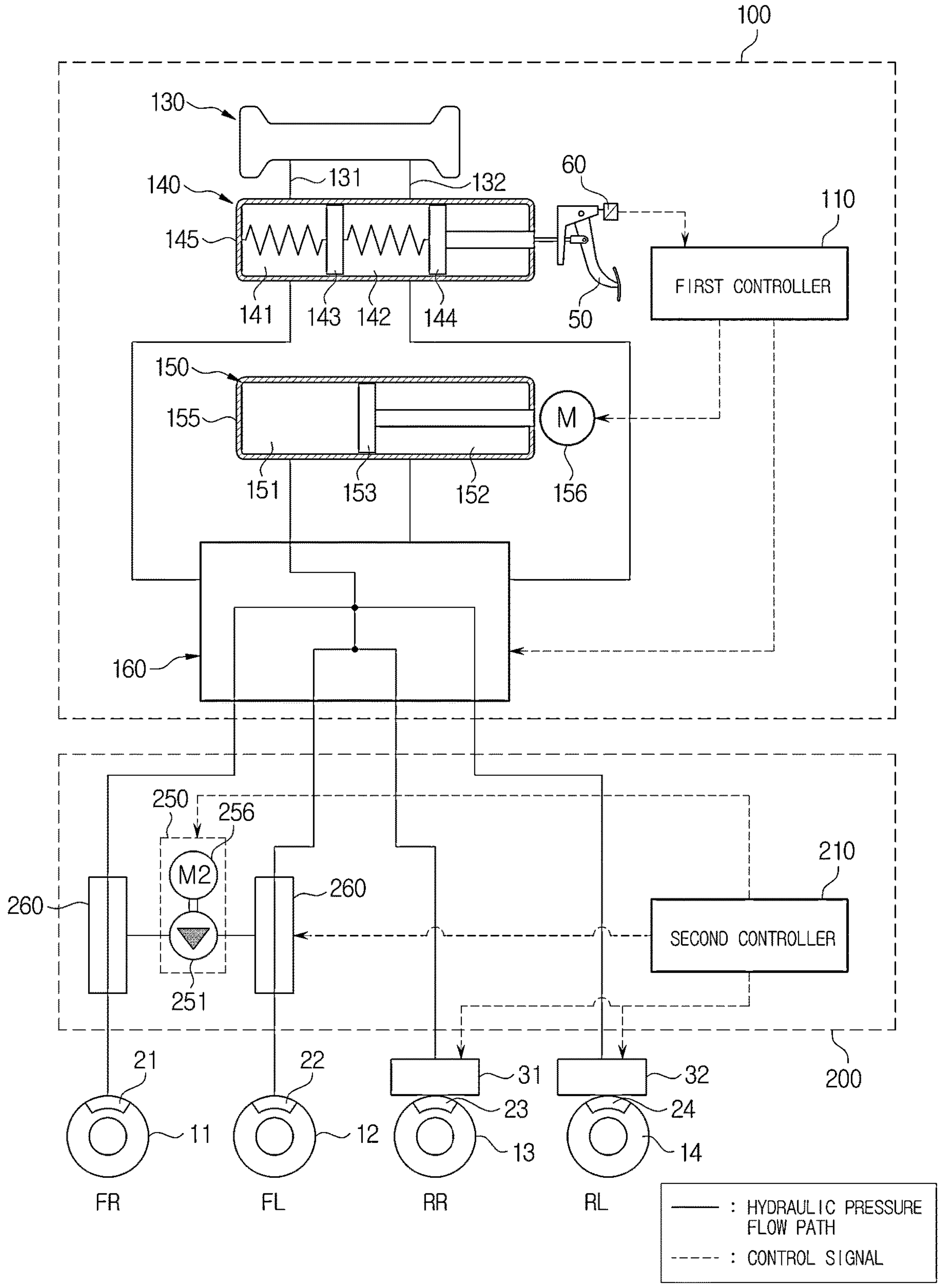
FIGS. 2 and 3 illustrate a configuration of a brake system according to one embodiment.
Figure 3:
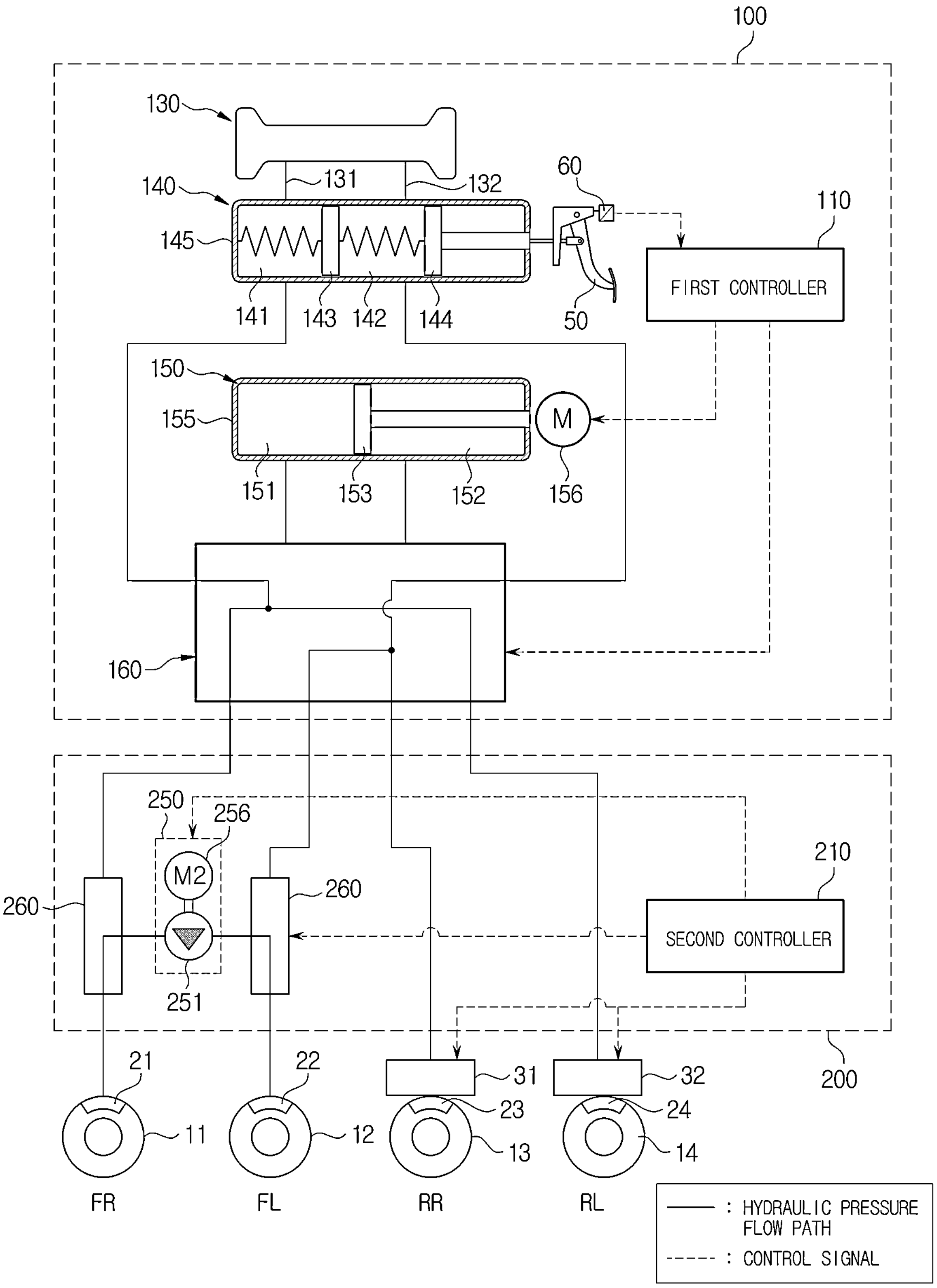

FIGS. 2 and 3 illustrate a configuration of a brake system according to one embodiment.

The first hydraulic pressure supply device 100 may include a reservoir 130, a master cylinder 140, the first hydraulic pressure supplier 150, a first hydraulic pressure controller 160, and the first controller 110. The reservoir 130, the master cylinder 140, the first hydraulic pressure supplier 150, the first hydraulic pressure controller 160, and the first controller 110 illustrated in FIGS. 2 and 3 do not correspond to essential components of the first hydraulic pressure supply device 100, and at least some components may be omitted.

The reservoir 130 may store a pressing medium such as a brake oil. The reservoir 130 may be connected to each component element to supply or receive the pressing medium. The reservoir 130 may be hydraulically connected to the master cylinder 140 through reservoir flow paths 131 and 132.

The master cylinder 140 may compress and discharge the pressing medium accommodated therein according to a pedal force of the brake pedal 50. The master cylinder 140 may include a first master chamber 141 and a second master chamber 142 formed by a master cylinder block 145. A first master piston 143 and a second master piston 144 are provided in the first master chamber 141 and the second master chamber 142, respectively.

The first hydraulic pressure supplier 150 may provide the hydraulic pressure of the pressing medium in response to a control signal of the first controller 110.

The first hydraulic pressure supplier 150 may include a cylinder block 155 accommodating the pressing medium, a hydraulic piston 153 provided to reciprocate in the cylinder block 155, and hydraulic pressure chambers 151 and 152 partitioned by the hydraulic piston 153. The cylinder block 155, the hydraulic piston 153, and the hydraulic pressure chambers 151 and 152 do not correspond to essential components of the first hydraulic pressure supplier 150, and at least some of them may be omitted.

The hydraulic pressure may be generated in the hydraulic pressure chambers 151 and 152 by the reciprocating movement of the hydraulic piston 153. The hydraulic pressures in the hydraulic pressure chambers 151 and 152 may be transmitted to the wheel cylinders 21, 22, 23, and 24 through the first hydraulic pressure controller 160.

The hydraulic pressure chambers 151 and 152 may include the first hydraulic pressure chamber 151 positioned in front of the hydraulic piston 153 (at a left side of the hydraulic piston in FIG. 2) and a second hydraulic pressure chamber 152 positioned behind the hydraulic piston (at a right side of the hydraulic piston in FIG. 2).

The first hydraulic pressure chamber 151 may be formed by the cylinder block 155 and a front surface of the hydraulic piston 153, and a volume of the first hydraulic pressure chamber 151 may be changed according to the movement of the hydraulic piston 153. In addition, the second hydraulic pressure chamber 152 may be formed by the cylinder block 155 and a rear surface of the hydraulic piston 153, and a volume of the second hydraulic pressure chamber 152 may be changed according to the movement of the hydraulic piston 153. The first hydraulic pressure chamber 151 and the second hydraulic pressure chamber 152 may each be hydraulically connected to the first hydraulic pressure controller 160 by hydraulic pressure flow paths.

The first hydraulic pressure supplier 150 may include a first motor 156 for providing a torque for moving the hydraulic piston 153. In addition, the first hydraulic pressure supplier 150 may further include a power conversion unit for converting the torque of the first motor 156 into a translational movement of the hydraulic piston 153.

The first hydraulic pressure controller 160 may be provided between the first hydraulic pressure supplier 150 and the wheel cylinders 21, 22, 23, and 24. The first hydraulic pressure controller 160 may include, for example, a plurality of hydraulic pressure flow paths extending from the first hydraulic pressure supplier 150 to each of the wheel cylinders 21, 22, 23, and 24, and a first valve block 161 provided with a plurality of valves which may allow or block a flow of the pressing medium on the plurality of flow paths.

As illustrated in FIG. 2, the first hydraulic pressure controller 160 may control the hydraulic pressure flow paths to guide the hydraulic pressure generated by the first hydraulic pressure supplier 150 to the wheel cylinders 21, 22, 23, and 24 or control the hydraulic pressure flow paths to return the hydraulic pressures of the wheel cylinders 21, 22, 23, and 24 to the first hydraulic pressure supplier 150.

For example, in response to an increase in a stroke of the brake pedal 50, the first hydraulic pressure controller 160 may control the hydraulic pressure flow paths to guide the hydraulic pressure generated in the first hydraulic pressure chamber 151 to the wheel cylinders 21, 22, 23, and 24 while the hydraulic piston 153 moves forward. In addition, the first hydraulic pressure controller 160 may control the hydraulic pressure flow paths to guide the hydraulic pressure generated in the second hydraulic pressure chamber 152 to the wheel cylinders 21, 22, 23, and 24 while the hydraulic piston 153 moves backward after moving forward.

In addition, in response to a decrease in the stroke of the brake pedal 50, the first hydraulic pressure controller 160 may control the hydraulic pressure flow paths to return the hydraulic pressures of the wheel cylinders 21, 22, 23, and 24 to the first hydraulic pressure chamber 151 while the hydraulic piston 153 moves forward. In addition, the first hydraulic pressure controller 160 may control the hydraulic pressure flow path to return the hydraulic pressures of the wheel cylinders 21, 22, 23, and 24 to the second hydraulic pressure chamber 152 while the hydraulic piston 153 moves backward after moving forward.

As illustrated in FIG. 3, when a failure such as an inoperable state of the first hydraulic pressure supplier 150 occurs, the first hydraulic pressure controller 160 may control the hydraulic pressure flow paths to guide the hydraulic pressure generated by the master cylinder 140 to the cylinders 21, 22, 23, and 24 or control the hydraulic pressure flow paths to return the hydraulic pressures of the wheel cylinders 21, 22, 23, and 24 to the master cylinder 140.

For example, in response to a failure such as an inoperable state of the first hydraulic pressure supplier 150, the first hydraulic pressure controller 160 may control the flow paths to guide the hydraulic pressure generated in the first master chamber 141 to the first and second wheel cylinders 21 and 22 while the first master piston 143 moves forward and guide the hydraulic pressure generated in the second master chamber 142 to the third and fourth wheel cylinders 23 and 24 while the second master piston 144 moves forward.

Hereinafter, a state in which the master cylinder 140 and the wheel cylinders 21, 22, 23, and 24 are hydraulically connected due to the occurrence of a failure in the first hydraulic pressure supplier 150 may be referred to as a fallback mode.

In addition, when power is not supplied to the first hydraulic pressure supply device 100 or a failure such as an inoperable state of the first hydraulic pressure supply device 100 occurs, the flow paths for guiding the hydraulic pressure generated by the master cylinder 140 to the wheel cylinders 21, 22, 23, and 24 may be generated in the first hydraulic pressure controller 160.

As described above, not only when a failure occurs in the first hydraulic pressure supplier 150 but also when a failure occurs in the first hydraulic pressure supply device 100, the brake system may operate in the fallback mode.

The first controller 110 may include a plurality of semiconductor devices and may be called variously, such as an electronic control unit (ECU). The first controller 110 may include, for example, a plurality of processors and/or a plurality of memories.

The first controller 110 may receive a pedal signal indicating a user's brake intention from the pedal sensor 60. The pedal sensor 60 may detect the movement of the brake pedal 50 moving according to the user's brake intention and output an electrical signal (pedal signal) which is dependent on a moving distance and/or moving speed of the brake pedal 50. The first controller 110 may provide the electrical signal for supplying or returning the hydraulic pressure to or from the wheel cylinders 21, 22, 23, and 24 to the first hydraulic pressure supplier 150 and the first hydraulic pressure controller 160 in response to the pedal signal.

The first controller 110 may transmit or receive data to or from the second controller 210. For example, the first controller 110 may transmit or receive data to or from the second controller 210 through a vehicle communication network or transmit or receive data to or from the second controller 210 through a data line directly connected to the second controller 210.

The first controller 110 may periodically transmit the electrical signal to the second controller 210 in a normal state. On the other hand, the first controller 110 may not transmit the periodic signal to the second controller 210 in a failed state.

The second hydraulic pressure supply device 200 may be provided on the flow paths between the first and second wheel cylinders 21 and 22 and the first hydraulic pressure supply device 100.

The second hydraulic pressure supply device 200 may include the second hydraulic pressure supplier 250, a second hydraulic pressure controller 260, and the second controller 210. The second hydraulic pressure supplier 250, the second hydraulic pressure controller 260, and the second controller 210 illustrated in FIGS. 2 and 3 do not correspond to essential components of the second hydraulic pressure supply device 200, and at least some of them may be omitted.

The second hydraulic pressure supplier 250 may provide the hydraulic pressure of the pressing medium in response to a control signal of the second controller 210.

The second hydraulic pressure supplier 250 may include a pump 251 that rotates and pumps the pressing medium, and a second motor 256 for providing a torque for driving the pump 251.

The second hydraulic pressure controller 260 may be provided between the first and second hydraulic pressure suppliers 150 and 250 and the first and second wheel cylinders 21 and 22. The second hydraulic pressure controller 260 may include, for example, a second valve block 261 provided with a plurality of hydraulic pressure flow paths extending from the second hydraulic pressure controller 260 to each of the first and second wheel cylinders 21 and 22 and a plurality of valves which may allow or block the flow of the pressing medium on the plurality of flow paths.

The second hydraulic pressure controller 260 may allow the hydraulic pressure flow paths between the first hydraulic pressure supplier 150 and the first and second wheel cylinders 21 and 22 or close the hydraulic pressure flow paths between the first hydraulic pressure supplier 150 and the first and second wheel cylinders 21 and 22. For example, the second hydraulic pressure controller 260 may open the hydraulic pressure flow paths between the first hydraulic pressure supplier 150 and the first and second wheel cylinders 21 and 22 as illustrated in FIG. 2 in the normal state of the first hydraulic pressure supplier 150. In addition, the second hydraulic pressure controller 260 may block the hydraulic pressure flow paths between the first hydraulic pressure supplier 150 and the first and second wheel cylinders 21 and 22 as illustrated in FIG. 3 in the failed state of the first hydraulic pressure supplier 150.

In addition, the second hydraulic pressure controller 260 may control the hydraulic pressure flow paths to guide the hydraulic pressure generated by the second hydraulic pressure supplier 250 to the first and second wheel cylinders 21 and 22 as illustrated in FIG. 3 in the failed state of the first hydraulic pressure supplier 150 or control the hydraulic pressure flow paths to return the hydraulic pressures of the first and second wheel cylinders 21 and 22 to the reservoir 130.

For example, in response to an increase in the stroke of the brake pedal 50, the second hydraulic pressure controller 260 may control the hydraulic pressure flow paths to guide the hydraulic pressure provided from the pump 251 to the first and second wheel cylinders 21 and 22. In addition, in response to a decrease in the stroke of the brake pedal 50, the second hydraulic pressure controller 260 may control the hydraulic pressure flow paths to return the hydraulic pressures of the first and second wheel cylinders 21 and 22 to the reservoir 130.

The second controller 210 may include a plurality of semiconductor devices and may be called variously, such as an ECU. The second controller 210 may include, for example, a plurality of processors and/or a plurality of memories.

The second controller 210 may transmit or receive data to or from the first controller 110. For example, the second controller 210 may transmit or receive data to or from the first controller 110 through a vehicle communication network or transmit or receive data to or from the first controller 110 through a data line directly connected to the first controller 110.

The second controller 210 may periodically receive the electrical signal from the first controller 110 in the normal state of the first controller 110. The second controller 210 may identify the normal state of the first controller 110 based on the periodic signal of the first controller 110. On the other hand, the second controller 210 may identify the failed state of the first controller 110 based on that no electrical signal is received from the first controller 110.

In the failed state of the first controller 110, the second controller 210 may receive the pedal signal indicating the user's brake intention from the pedal sensor 60. The second controller 210 may provide the electrical signal for supplying the hydraulic pressure to the first and second wheel cylinders 21 and 22 to brake the first and second wheels 11 and 12 to the second hydraulic pressure supplier 250 and the second hydraulic pressure controller 260 in response to the pedal signal. In addition, the second controller 210 may provide the electrical signal for braking the third and fourth wheels 13 and 14 to the first and second parking brakes 31 and 32 in response to the pedal signal.

Figure 4:
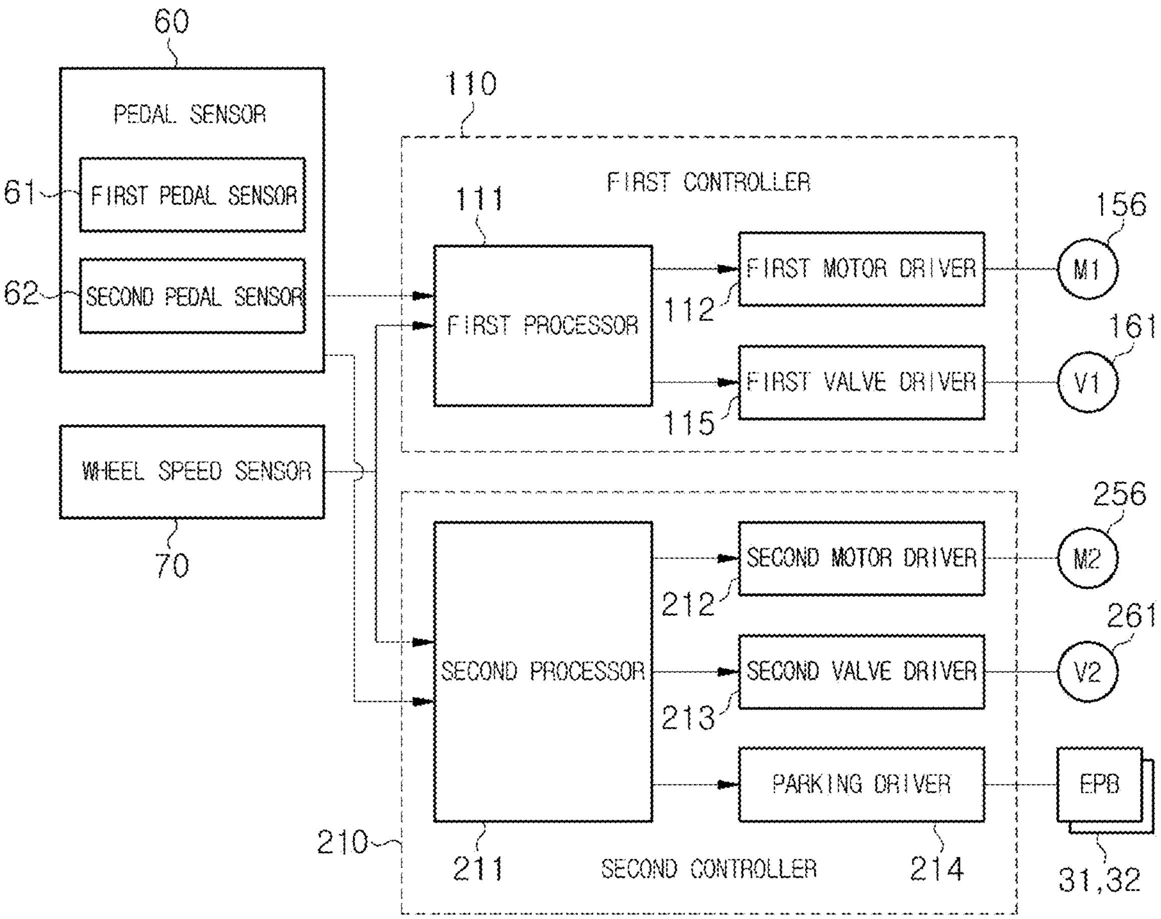
FIG. 4 illustrates a configuration of first and second controllers included in the brake system according to one embodiment.

FIG. 4 illustrates a configuration of first and second controllers included in the brake system according to one embodiment.

Referring to FIGS. 1 to 4, in the disclosed embodiment, the brake system may include a pedal sensor 60, a wheel speed sensor 70, the parking brakes 31 and 32, the first hydraulic pressure supply device 100, and the second hydraulic pressure supply device 200.

The first hydraulic pressure supply device 100 may include the first motor 156, the first valve block 161, and the first controller 110. In addition, the second hydraulic pressure supply device 200 may include the second motor 256, the second valve block 261, and the second controller 210. Here, the first motor 156, the first valve block 161, and the first controller 110 do not correspond to essential components of the first hydraulic pressure supply device 100, and at least some of them may be omitted. In addition, the second motor 256, the second valve block 261, and the second controller 210 do not correspond to essential components of the second hydraulic pressure supply device 200, and at least some of them may be omitted.

The pedal sensor 60 may detect the movement of the brake pedal 50 according to the user's brake intention and provide the electrical signal (pedal signal) indicating the moving distance and/or moving speed of the brake pedal 50 to the first controller 110 and the second controller 210.

The pedal sensor 60 may include a first pedal sensor 61 and a second pedal sensor 62. Each of the first pedal sensor 61 and the second pedal sensor 62 may detect the moving distance and/or moving speed of the brake pedal 50 and provide the electrical signals (first pedal signal and second pedal signal) indicating the detected moving distance and/or moving speed to the first controller 110 and the second controller 210.

The first pedal sensor 61 may acquire power from a different power source (e.g., a different battery or a different power network) from the second pedal sensor 62. For example, the first pedal sensor 61 may acquire the power from the first battery B1 or the first power network through the first hydraulic pressure supply device 100, and the second pedal sensor 62 may acquire the power from the second battery B2 or the second power network through the second hydraulic pressure supply device 200. Therefore, even when a failure, such as power cutoff or inoperability, occurs in any one of the first pedal sensor 61 or the second pedal sensor 62, the first controller 110 and the second controller 210 may acquire a pedal signal from another pedal sensor and identify the driver's brake intention.

The wheel speed sensor 70 may detect the rotation of the wheels 11, 12, 13, and 14 due to the traveling of the vehicle 1 and provide electrical signals (wheel speed signals) corresponding to rotational speeds of the wheels 11, 12, 13, and 14 to the first controller 110 and the second controller 210.

Unlike the pedal sensor 60, the wheel speed sensor 70 may be provided with one sensor for each of the wheels 11, 12, 13, and 14. For example, four wheel speed sensors provided at each of the four wheels 11, 12, 13, and 14 may each provide wheel speed signals to the first controller 110 and the second controller 210. The wheel speed sensor 70 may acquire power from the second hydraulic pressure supply device 200 in the failed state of the first hydraulic pressure supply device 100 and provide the wheel speed signal to the second controller 210 of the second hydraulic pressure supply device 200. In addition, the wheel speed sensor 70 may acquire power from the first hydraulic pressure supply device 100 in the normal state of the first hydraulic pressure supply device 100 and provide the wheel speed signal to the first controller 110 of the first hydraulic pressure supply device 100.

The parking brakes 31 and 32 may be provided on at least some of the wheels 11, 12, 13 and 14 and may restrict the rotation of the wheels 11, 12, 13 and 14. For example, the parking brakes 31 and 32 may be provided on the third wheel 13 and the fourth wheel 14 to drive the rotation of the third wheel 13 and the fourth wheel 14. Each of the parking brakes 31 and 32 may include a motor, and a torque provided by the motor provided in each of the parking brakes 31 and 32 may be converted into a translational movement along which the brake pad moves toward the disk by the spindle.

The first motor 156 may provide power (torque) for generating the hydraulic pressure of the pressing medium to the cylinder block 155 and the hydraulic piston 153. The hydraulic piston 153 may perform the translational movement by the torque provided by the first motor 156.

The first valve block 161 may control the flow path of the pressing medium extending from the first hydraulic pressure supplier 150 to the wheel cylinders 21, 22, 23, and 24. The first valve block 161 may include a plurality of solenoid valves provided on the flow path of pressing medium.

The first controller 110 may provide the electrical signal for providing the hydraulic pressure of the pressing medium to the wheel cylinders 21, 22, 23, and 24 in response to the user's brake intention due to the brake pedal 50 and the rotational speeds of the wheels 11, 12, 13, and 14.

The first controller 110 may include a first motor driver 112, a first valve driver 115, and a first processor 111. The first motor driver 112, the first valve driver 115, and the first processor 111 do not correspond to essential components of the first controller 110, and at least some of them may be omitted.

The first motor driver 112 may receive a control signal from the first processor 111 and provide a driving current for driving the first motor 156 of the first hydraulic pressure supplier 150 in response to the control signal of the first processor 111. For example, the first motor driver 112 may provide a driving current for moving the hydraulic piston 153 in a moving-forward direction to the first motor 156 or provide a driving current for moving the hydraulic piston 153 in a moving-backward direction to the first motor 156 in response to a control signal of the first processor 111. The first motor driver 112 may include, for example, an inverter circuit for controlling the driving current of the first motor 156, a gate driver for driving an input terminal of the inverter circuit, and the like.

The first valve driver 115 may receive the control signal from the first processor 111 and provide a driving current for driving the first valve block 161 of the first hydraulic pressure controller 160 in response to the control signal of the first processor 111. For example, in response to the control signal of the first processor 111, the first valve driver 115 may provide the driving current to each of the valves so that the flow paths may be formed from the first hydraulic pressure chamber 151 of the first hydraulic pressure supplier 150 to the wheel cylinders 21, 22, 23, and 24 or provide the driving current to each of the valves so that the flow paths may be formed from the second hydraulic pressure chamber 152 of the first hydraulic pressure supplier 150 to the wheel cylinders 21, 22, 23, and 24.

The first processor 111 may process output signals of the pedal sensor 60 and the wheel speed sensor 70 and control the first hydraulic pressure supply device 100 based on a result of processing the output signals.

The first processor 111 may control the first motor driver 112 and/or the first valve driver 115 to drive the first motor 156 and/or the first valve block 161 based on the pedal signal of the pedal sensor 60. For example, the first processor 111 may receive a pedal signal indicating an increase or decrease in the stroke of the brake pedal 50 from the pedal sensor 60 and provide the control signals for controlling the first motor and/or the first valve block 161 to the first motor driver 112 and/or the first valve driver 115 based on the received pedal signal. Therefore, the first hydraulic pressure supply device 100 can achieve a service brake.

The first processor 111 may control the first motor driver 112 and/or the first valve driver 115 to drive the first motor 156 and/or the first valve block 161 based on the wheel speed signal of the wheel speed sensor 70. For example, the first processor 111 may receive the wheel speed signal indicating the rotational speeds of the wheels 11, 12, 13, and 14 from the wheel speed sensor 70 and provide the control signals for controlling the first motor 156 and/or the first valve block 161 to the first motor driver 112 and/or the first valve driver 115 based on the wheel speed signal. Therefore, the first hydraulic pressure supply device 100 can achieve an anti-lock brake system (ABS).

The first processor 111 may include one or more semiconductor devices. The first processor 111 may include one core or a plurality of cores in the semiconductor device. In addition, the first processor 111 may be called variously, such as a micro controller unit (MCU).

In addition, the first processor 111 may include a memory for recording/storing programs and data for braking the vehicle based on the user's brake intention and/or the rotational speeds of the wheels 11, 12, 13, and 14. The memory may provide the programs and the data to the first processor 111 and record temporary data generated during a calculation operation of the first processor 111. The memory may include, for example, volatile memories such as a static random access memory (SRAM) and a dynamic RAM (DRAM) and non-volatile memories such as a read only memory (ROM), an erasable programmable ROM (EPROM), and a flash memory.

The second motor 256 may provide power (torque) for generating the hydraulic pressure of the pressing medium to the pump 251. The pump 251 may pump the pressing medium by the torque provided by the second motor 256.

The second valve block 261 may control the flow paths of the pressing medium extending from the first hydraulic pressure supplier 150 to the first and second wheel cylinders 21 and 22 and the flow paths of the pressing medium extending from the second hydraulic pressure supplier 250 to the first and second wheel cylinders 21 and 22. The second valve block 261 may include a plurality of solenoid valves provided on the flow path of pressing medium.

The second controller 210 may provide the electrical signals for providing (returning) the hydraulic pressure of the pressing medium to or from the first and second wheel cylinders 21 and 22 or provide the electrical signals for engaging (disengaging) the parking brakes in response to the user's brake intention due to the brake pedal 50 and the rotational speeds of the wheels 11, 12, 13, and 14.

The second controller 210 may include a second motor driver 212, a second valve driver 213, a parking driver 214, and a second processor 211. The second motor driver 212, the second valve driver 213, the parking driver 214, and the second processor 211 do not correspond to essential components of the second controller 210, and at least some of them may be omitted.

The second motor driver 212 may receive a control signal from the second processor 211 and provide a driving current for driving the second motor 256 of the second hydraulic pressure supplier 250 in response to the control signal of the second processor 211. For example, the second motor driver 212 may provide a driving current for allowing the pump 251 to pump the pressing medium to the second motor 256 in response to the control signal of the second processor 211. The second motor driver 212 may include, for example, an H bridge circuit for controlling the driving current of the second motor 256, a gate driver for driving an input terminal of the H bridge circuit, and the like.

The second valve driver 213 may receive the control signal from the second processor 211 and provide a driving current for driving the second valve block 261 of the second hydraulic pressure controller 260 in response to the control signal of the second processor 211. For example, in response to the control signal of the second processor 211, the second valve driver 213 may provide the driving current to each of the valves so that the flow paths may be formed from the pump 251 of the second hydraulic pressure supplier 250 to the first and second wheel cylinders 21 and 22 or provide the driving current to each of the valves so that the flow paths from the first hydraulic pressure supplier 150 to the first and second wheel cylinders 21 and 22 may be blocked.

The parking driver 214 may receive an engaging or disengaging signal of the second processor 211 and provide a driving current for engaging or disengaging the parking brakes to the parking brakes 31 and 32 in response to the engaging or disengaging signal. For example, the parking driver 214 may apply a driving current for restricting or releasing the restriction of the rotation of the third and fourth wheels 13 and 14 to the parking brakes 31 and 32 in response to the control signal. The parking driver 214 may include an H bridge circuit for controlling the driving currents of the parking brakes 31 and 32, a gate driver for driving an input terminal of the H bridge circuit, and the like.

The second processor 211 may process output signals of the pedal sensor 60 and the wheel speed sensor 70 and control the second hydraulic pressure supply device 200 and the parking brakes 31 and 32 based on a result of processing the output signals.

The second processor 211 may transmit or receive data and/or signals to or from the first processor 111 through various paths. For example, the second processor 211 may transmit or receive data and/or signals to or from the first processor 111 through a signal line connected to the first processor 111 or transmit or receive data and/or signals to or from the first processor 111 through the vehicle communication network.

The second processor 211 may transmit or receive various types of data and/or signals to or from the first processor 111. For example, the first processor 111 may periodically transmit the electrical signal (e.g., a pulse signal) to the second processor 211 in the normal state.

The second processor 211 may receive a periodic signal (e.g., the pulse signal) of the first processor 111 and deactivate the second hydraulic pressure supply device 200 while receiving the periodic signal of the first processor 111. For example, the second processor 211 may control the second motor driver 212 not to drive the second motor 256 while receiving the periodic signal. While receiving the periodic signal, the second processor 211 may control the second valve driver 213 to allow the second valve block 261 to allow the flow paths between the first hydraulic pressure supply device 100 and the first and second wheel cylinders 21 and 22.

The second processor 211 may be activated based on that no periodic signal (e.g., the pulse signal) of the first processor 111 is received. When no periodic signal is received from the first processor 111, the second processor 211 may identify that the first processor 111 is not in the normal state (i.e., that the first processor 111 is in the failed state) and may be activated to perform at least some of functions of the first processor 111.

The second processor 211 may control the second motor driver 212, the second valve driver 213, and/or the parking driver 214 to drive the second motor 256, the second valve block 261, and/or the parking brakes 31 and 32 based on the pedal signal of the pedal sensor 60 in the failed state of the first hydraulic pressure supply device 100. For example, the second processor 211 may receive the pedal signal indicating an increase or decrease in the stroke of the brake pedal 50 from the pedal sensor 60 and provide control signals for controlling the second motor 256, the second valve block 261, and/or the parking brakes 31 and 32 to the second motor driver 212, the second valve driver 213, and/or the parking driver 214 based on the pedal signal. Therefore, the second hydraulic pressure supply device 200 can achieve a service brake in the failed state of the first hydraulic pressure supply device 100.

The second processor 211 may control the second motor driver 212, the second valve driver 213, and/or the parking driver 214 to drive the second motor 256, the second valve block 261, and/or the parking brakes 31 and 32 based on the wheel speed signal of the wheel speed sensor 70 in the failed state of the first hydraulic pressure supply device 100. For example, the second processor 211 may receive the wheel speed signal indicating the rotational speeds of the wheels 11, 12, 13, and 14 from the wheel speed sensor 70 and provide the control signals for controlling the second motor 256, the second valve block 261, and/or the parking brakes 31 and 32 to the second motor driver 212, the second valve driver 213, and/or the parking driver 214 based on the wheel speed signal. Therefore, second hydraulic pressure supply device 200 can achieve an ABS in the failed state of the first hydraulic pressure supply device 100.

second processor 211 may transmit the periodic signal (e.g., the pulse signal) to the first processor 111 during the normal operation. The first processor 111 may identify whether the second processor 211 is in the normal state based on whether the periodic signal of the second processor 211 is received.

The second processor 211 may include one or more semiconductor devices. The second processor 211 may include one core or a plurality of cores in the semiconductor device. In addition, the second processor 211 may be called variously, such as an MCU.

In addition, the second processor 211 may include a memory for recording/storing programs and data for braking the vehicle based on the user's brake intention and/or the rotational speeds of the wheels 11, 12, 13, and 14. The memory may provide the programs and the data to the second processor 211 and record temporary data generated during a calculation operation of the second processor 211. The memory may include, for example, volatile memories such as an SRAM and a DRAM and non-volatile memories such as a ROM, an EPROM, and a flash memory.

As described above, the brake system of the vehicle 1 may include the first hydraulic pressure supply device 100 and brake the vehicle 1 in response to the user's brake intention and park. In addition, the brake system may further include the second hydraulic pressure supply device 200 to provide redundancy. The second hydraulic pressure supply device 200 may brake the vehicle in response to the user's brake intention and/or park instructions when the first hydraulic pressure supply device 100 is in the failed state. Therefore, the brake system may brake the vehicle 1 by the operation of the second hydraulic pressure supply device 200 even when the first hydraulic pressure supply device 100 is not normally operated.

Figure 5:
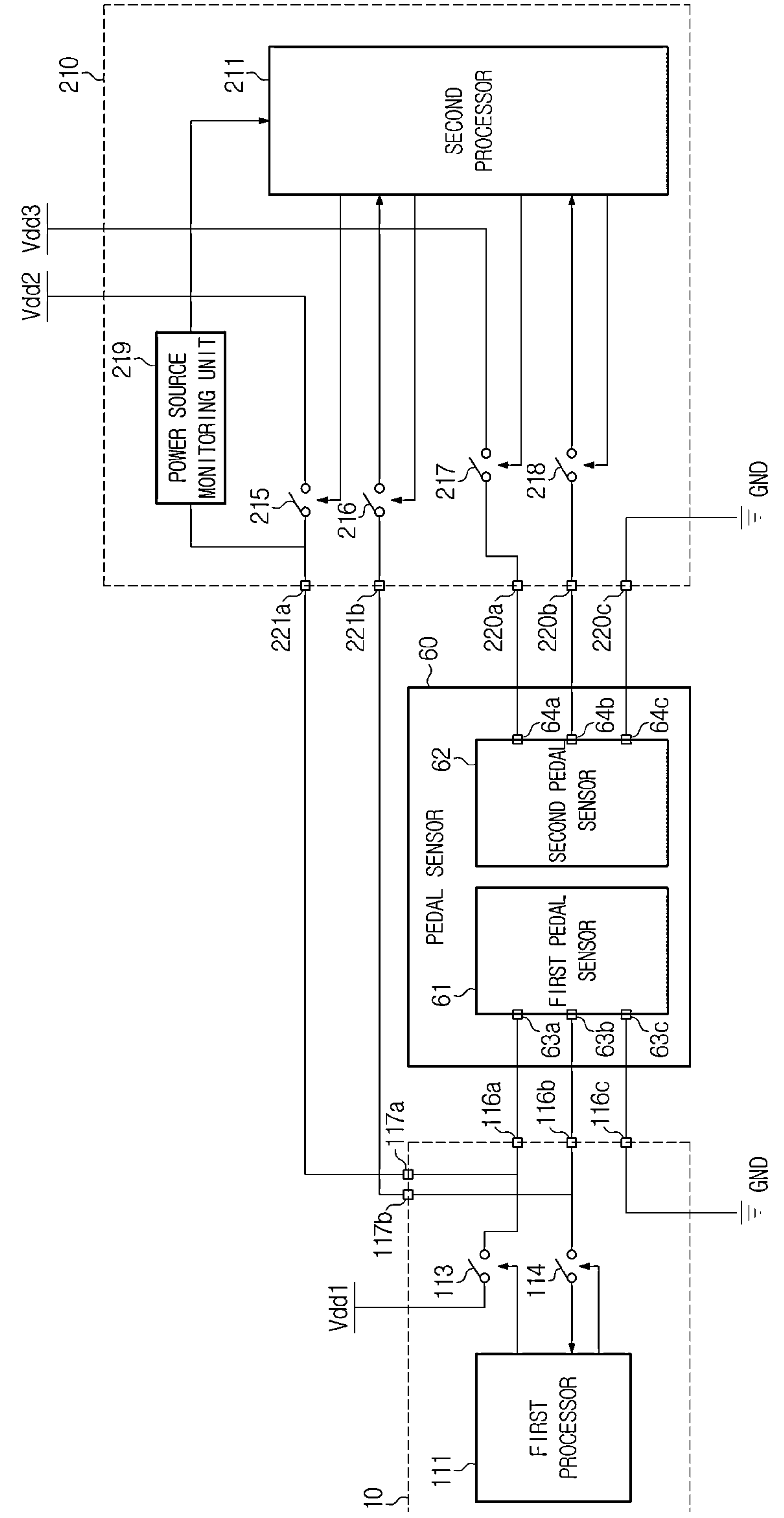
FIG. 5 illustrates one example of connections between the first controller, the second controller, and a pedal sensor, which are included in the brake system according to one embodiment.

FIG. 5 illustrates one example of connections between the first controller, the second controller, and a pedal sensor, which are included in the brake system according to one embodiment.

Referring to FIG. 5, the brake system may include the pedal sensor 60, the first controller 110, and the second controller 210.

The pedal sensor 60 may include the first pedal sensor 61 and the second pedal sensor 62 as described with reference to FIG. 4, the first pedal sensor 61 may be connected to the first controller 110, and the second pedal sensor 62 may be connected to the second controller 210.

The first pedal sensor 61 may provide the first pedal signal corresponding to the moving distance and/or moving speed of the brake pedal 50 to the first controller 110 and provide the second pedal signal corresponding to the moving distance and/or moving speed of the brake pedal 50 to the second controller 210. The signals provided by the pedal sensors 61 and 62 may include information indicating a state of the pedal sensor. Therefore, in case of a failure of the sensor, since the signal provided by the pedal sensor 60 includes information indicating a failure of the pedal sensor, the first controller 110 or the second controller 210 may recognize the failure of the pedal sensor 60. For example, although the pedal sensors 61 and 62 may provide the signals to the first controller 110 and the second controller 210 using a single edge nibble transmission (SENT) communication protocol, the present disclosure is not limited thereto.

The first controller 110 may include a first switch 113, a second switch 114, and the first processor 111. In various embodiments, the first controller 110 may further include the first motor driver 112, the first valve driver 115, and a first analog filter circuit (not illustrated). The first motor driver 112, the first switch 113, the second switch 114, the first valve driver 115, the first analog filter circuit, and the first processor 111 do not correspond to the essential components of the first controller 110, and at least some of them may be omitted.

The first controller 110 may acquire power from a first power source Vdd1. In other words, a first current provided from the first power source Vdd1 may flow to a common ground GND through the first controller 110.

The first controller 110 may include a first terminal 116*a* connected to a power source terminal 63*a* of the first pedal sensor 61 and a second terminal 116*b* connected to a signal terminal 63*b* of the first pedal sensor 61. In addition, the first controller 110 includes a third terminal 116*c* connected to a ground terminal 63*c* of the first pedal sensor 61, and the third terminal 116*c* may be connected to the common ground GND of the first controller 110.

The first terminal 116*a* of the first controller 110 may be connected to the first power source Vdd1, and the first switch 113 may be provided on a line connecting the first terminal 116*a* to the first power source Vdd1. The second terminal 116*b* of the first controller 110 may be connected to the first processor 111, and the second switch 114 may be provided on a line connecting the second terminal 116*b* to the first processor 111.

The first current provided from the first power source Vdd1 may be supplied to the first pedal sensor 61 through the first switch 113.

The first switch 113 may be provided on a conductive line between the first power source Vdd1 and the first pedal sensor 61 and may allow or block an electrical connection between the first power source Vdd1 and the first pedal sensor 61 in response to the control signal of the first processor 111.

The second switch 114 may be provided on a conductive line between the first processor 111 and the first pedal sensor 61 and may allow or block an electrical connection between the first processor 111 and the first pedal sensor 61 in response to the control signal of the first processor 111.

The first processor 111 may provide the first switch 113 with an ON signal for maintaining an ON (closed) state of the first switch 113 in the normal state of the first hydraulic pressure supply device 100. Therefore, the first switch 113 may maintain the ON (closed) state in the normal state of the first hydraulic pressure supply device 100 and allow a current to be supplied from the first power source Vdd1 to the first pedal sensor 61.

The first processor 111 may provide the first switch 113 with an OFF signal for turning off (opening) the first switch 113 in the failed state of the first hydraulic pressure supply device 100. Therefore, the first switch 113 may maintain the OFF (open) state in the failed state of the first hydraulic pressure supply device 100 and block the current to be supplied from the first power source Vdd1 to the first pedal sensor 61. In addition, the first switch 113 may be turned off (opened) when not receiving the control signal due to the failure of the first processor 111.

The first processor 111 may provide the second switch 114 with an ON signal for maintaining an ON (closed) state of the second switch 114 in the normal state of the first hydraulic pressure supply device 100. Therefore, the second switch 114 may maintain the ON (closed) state in the normal state of the first hydraulic pressure supply device 100 and allow the first pedal sensor 61 to provide the pedal signal.

The first processor 111 may provide the second switch 114 with an OFF signal for turning off (opening) the second switch 114 in the failed state of the first hydraulic pressure supply device 100. Therefore, the second switch 114 may maintain the OFF (open) state in the failed state of the first hydraulic pressure supply device 100 and block the pedal signal of the first pedal sensor 61. In addition, the second switch 114 may be turned off (opened) when not receiving the control signal due to the failure of the first processor 111.

The first controller 110 may include fourth and fifth terminals 117*a* and 117*b* connected to a plurality of terminals of the second controller 210. The fourth terminal 117*a* may be connected to a line connecting the first switch 113 to the first terminal 116*a*, and the fifth terminal 117*b* may be connected to a line connecting the second switch 114 to the second terminal 116*b*. Therefore, the second controller 210 may monitor whether a current or a voltage is supplied to the first pedal sensor 61 and receive the first pedal signal from the first pedal sensor 61.

The second controller 210 may include a third switch 215, a fourth switch 216, a fifth switch 217, a sixth switch 218, a power source monitoring unit 219, and the second processor 211. In various embodiments, the second controller 210 may further include the second motor driver 212, the second valve driver 213, the parking driver 214, and a second analog filter circuit (not illustrated). The second motor driver 212, the second valve driver 213, the parking driver 214, the second analog filter circuit, the third switch 215, the fourth switch 216, the fifth switch 217, the sixth switch 218, the power source monitoring unit 219, and the second processor 211 do not correspond to the essential components of the second controller 210, and at least some of them may be omitted.

The second controller 210 may acquire currents from a second power source Vdd2 and/or a third power source Vdd3. A second current provided from the second power source Vdd2 may flow to the common ground GND of the first controller 110 through the second controller 210 and the first controller 110. According to various embodiments, a third current provided from the third power source Vdd3 may flow to the common ground GND of the second controller 210 through the second controller 210.

The second controller 210 may include a sixth terminal 220*a* connected to a power source terminal 64*a* of the second pedal sensor 62 and a seventh terminal 220*b* connected to a signal terminal 64*b* of the second pedal sensor 62. In addition, the second controller 210 may include an eighth terminal 220*c* connected to a ground terminal 64*c* of the second pedal sensor 62, and the eighth terminal 220*c* may be connected to the common ground GND of the second controller 210.

The sixth terminal 220*a* of the second controller 210 may be connected to the third power source Vdd3, and the fifth switch 217 may be provided on a line connecting the sixth terminal 220*a* to the third power source Vdd3. The seventh terminal 220*b* of the second controller 210 may be connected to the second processor 211, and the sixth switch 218 may be provided on a line connecting the seventh terminal 220*b* to the second processor 211.

The third current provided from the third power source Vdd3 may be supplied to the second pedal sensor 62 through the fifth switch 217.

The fifth switch 217 may be provided on a conductive line between the second power source Vdd3 and the second pedal sensor 62 and may allow or block an electrical connection between the third power source Vdd3 and the second pedal sensor 62 in response to the control signal of the second processor 211.

The sixth switch 218 may be provided on a conductive line between the second processor 211 and the second pedal sensor 62 and may allow or block an electrical connection between the second processor 211 and the second pedal sensor 62 in response to the control signal of the second processor 211.

The second processor 211 may provide the fifth switch 217 with an ON signal for maintaining an ON (closed) state of the fifth switch 217 in the normal state of the second hydraulic pressure supply device 200. Therefore, the fifth switch 217 may maintain the ON (closed) state in the normal state of the second hydraulic pressure supply device 200 and allow a current to be supplied from the third power source Vdd3 to the second pedal sensor 62.

The second processor 211 may provide the fifth switch 217 with an OFF signal for turning off (opening) the fifth switch 217 in the failed state of the second hydraulic pressure supply device 200. Therefore, the fifth switch 217 may maintain the OFF (open) state in the failed state of the second hydraulic pressure supply device 200 and block the current from being supplied from the third power source Vdd3 to the second pedal sensor 62. In addition, the fifth switch 217 may be turned off (opened) when not receiving the control signal due to the failure of the second processor 211.

The second processor 211 may provide the sixth switch 218 with an ON signal for maintaining an ON (closed) state of the sixth switch 218 in the normal state of the second hydraulic pressure supply device 200. Therefore, the sixth switch 218 may maintain the ON (closed) state in the normal state of the second hydraulic pressure supply device 200 and allow the second pedal sensor 62 to provide the pedal signal.

The second processor 211 may provide the sixth switch 218 with an OFF signal for turning off (opening) the sixth switch 218 in the failed state of the second hydraulic pressure supply device 200. Therefore, the sixth switch 218 may maintain the OFF (open) state in the failed state of the second hydraulic pressure supply device 200 and block the pedal signal of the second pedal sensor 62. In addition, the sixth switch 218 may be turned off (opened) when not receiving the control signal due to the failure of the second processor 211.

According to the disclosed embodiment, the second controller 210 may include a plurality of terminals (i.e., ninth and tenth terminals 221*a* and 221*b* connected to the fourth terminal and the fifth terminal 117*a* and 117*b*, respectively) of the first controller 110. The ninth terminal 221*a* may be connected to the fourth terminal 117*a* of the first controller 110, and the tenth terminal 221*b* may be connected to the fifth terminal 117*b* of the first controller 110. Therefore, the second controller 210 may monitor whether a current or a voltage is supplied to the first pedal sensor 61 and receive the first pedal signal from the first pedal sensor 61.

The second current provided from the second power source Vdd2 may be supplied to the first pedal sensor 61 through the third switch 215.

The third switch 215 may be provided on a conductive line between the second power source Vdd2 and the first controller 110 and may allow or block an electrical connection between the second power source Vdd2 and the first controller 110 in response to the control signal of the second processor 211.

The fourth switch 216 may be provided on a conductive line between the second processor 211 and the first controller 110 and may allow or block an electrical connection between the second processor 211 and the first controller 110 in response to the control signal of the second processor 211.

The power source monitoring unit 219 may detect whether a current or a voltage is supplied from the first power source Vdd1 to the first pedal sensor 61 and transmit a detection signal related to this to the second processor 211. For example, when the voltage provided to the first pedal sensor 61 is 0 V, the power source monitoring unit 219 may generate a detection signal indicating this and transmit the detection signal to the second processor 211. For example, the power source monitoring unit 219 may include a current sensor and/or a voltage sensor and determine whether to supply power by comparing a measured current or voltage with a predetermined threshold.

The second processor 211 may periodically receive the detection signal from the power source monitoring unit 219. The second processor 211 may provide the third switch 215 with an ON signal for maintaining the ON (closed) state of the third switch 215 based on the received detection signal. For example, the second processor 211 may receive the detection signal indicating that the voltage provided to the first pedal sensor 61 is 0 V from the power source monitoring unit 219. The second processor 211 receiving the detection signal may provide the third switch 215 with the ON signal for maintaining the ON (closed) state of the third switch 215. Therefore, the third switch 215 may maintain the ON (closed) state and allow the current to be supplied from the second power source Vdd2 to the first pedal sensor 61.

The second processor 211 may provide the fourth switch 216 with an ON signal for maintaining the ON (closed) state of the fourth switch 216. Therefore, the fourth switch 216 may maintain the ON (closed) state and allow the pedal signal to be provided from the first pedal sensor 61. In addition, the second processor 211 may provide the sixth switch 218 with an ON signal for maintaining the ON (closed) state of the sixth switch 218. Therefore, the sixth switch 218 may maintain the ON (closed) state and allow the pedal signal to be provided from the second pedal sensor 62.

In the presented embodiment, although it has been described that the operation of receiving the first pedal signal and the second pedal signal is performed sequentially, the present disclosure is not limited thereto, and these operations may be performed at least simultaneously, or any one of the first pedal signal or the second pedal signal may be provided, and then the other one of the first pedal signal or the second pedal signal may be provided.

The second processor 211 may control the braking operation of the vehicle 1 based on the first pedal signal received from the first pedal sensor 61 and the second pedal signal received from the second pedal sensor 62. Specifically, the second processor 211 may control the braking operation of the vehicle 1 based on whether the first pedal signal matches the second pedal signal. For example, when the first pedal signal matches the second pedal signal, the second processor 211 may perform brake driving based on any one of the first pedal signal or the second pedal signal.

When the first pedal signal does not match the second pedal signal, the second processor 211 may transmit a notification signal for safety control of the vehicle 1 to a driving assistance system (not illustrated) of the vehicle 1 so that the driving assistance system may perform vehicle safety control, such as moving and stopping the vehicle 1 to a safe zone (e.g., a shoulder).

According to various embodiments, the second processor 211 may receive the first pedal signal or the second pedal signal including information indicating a failure of the first pedal sensor 61 or the second pedal sensor 62 from the first pedal sensor 61 or the second pedal sensor 62. The second processor 211 receiving the pedal signal may transmit the notification signal for safety control of the vehicle 1 to the driving assistance system to perform vehicle safety control by the driving assistance system.

As described above, when the current is not supplied to the first pedal sensor 61 from the first power source Vdd1 due to the failed state of the first hydraulic pressure supply device 100 caused by the failure of the first hydraulic pressure supply device 100, the first pedal sensor 61 may acquire power from the second power source Vdd2 through the second controller 210 and provide the first pedal signal to the second processor 211 of the second controller 210.

Figure 6:
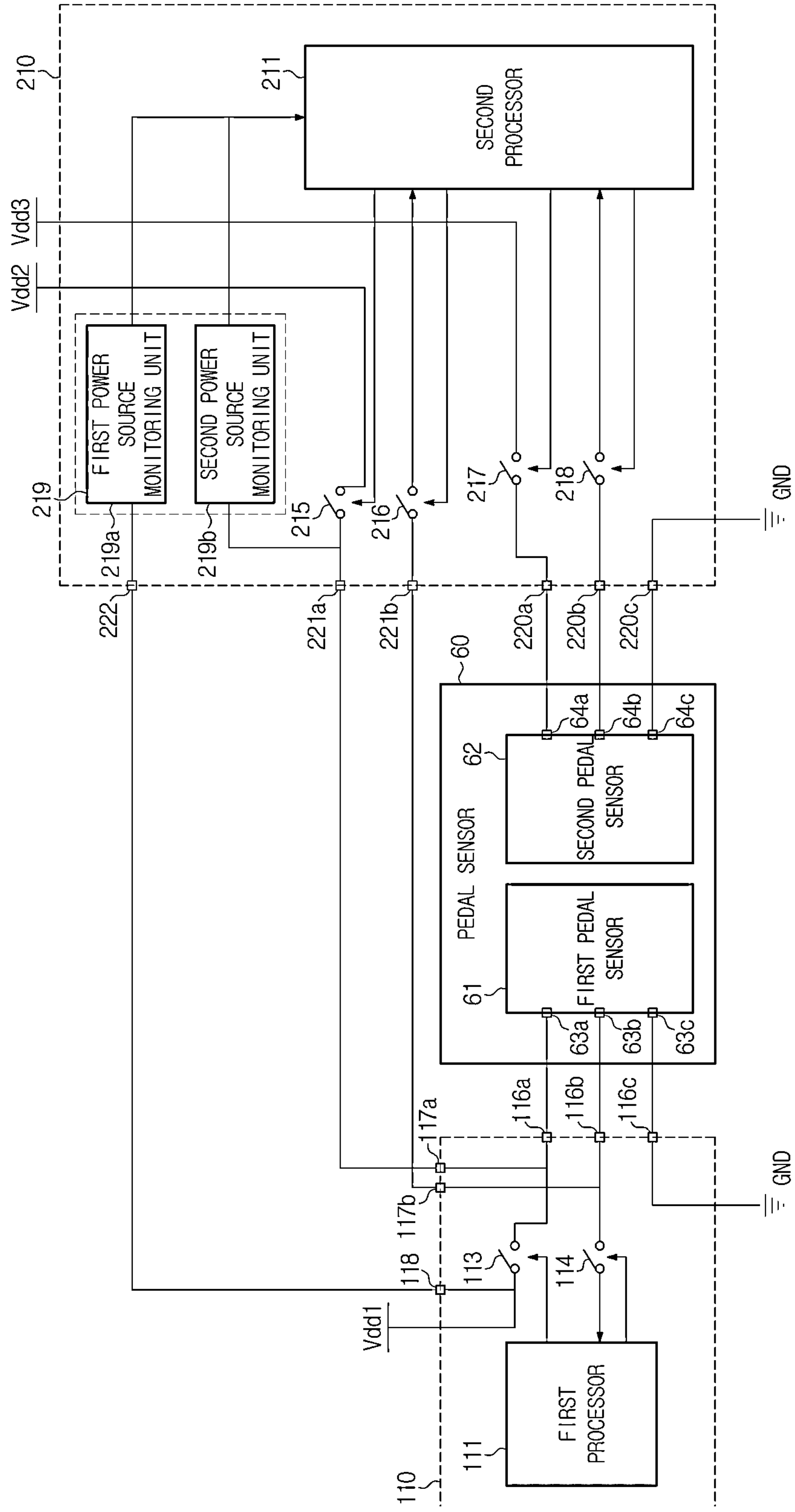
FIG. 6 illustrates one example of the connections between the first controller, the second controller, and the pedal sensor, which are included in the brake system according to various embodiments.

FIG. 6 illustrates one example of the connection between the first controller, the second controller, and the pedal sensor, which are included in the brake system according to various embodiments.

Referring to FIG. 6, the brake system may include the pedal sensor 60, the first controller 110, and the second controller 210.

Description of the pedal sensor 60 can be replaced with the description of the pedal sensor described with reference to FIG. 5.

The first controller 110 may include the first switch 113, the second switch 114, and the first processor 111. In various embodiments, the first controller 110 may further include the first motor driver 112, the first valve driver 115, and the first analog filter circuit (not illustrated). The first motor driver 112, the first switch 113, the second switch 114, the first valve driver 115, the first analog filter circuit, and the first processor 111 do not correspond to the essential components of the first controller 110, and at least some of them may be omitted.

Descriptions of the first switch 113, the second switch 114, and the first processor 111 can be replaced with the descriptions of the first switch, the second switch, and the first processor described with reference to FIG. 5.

The first controller 110 may further include an eleventh terminal 118 connected to a specific terminal of the second controller 210 (i.e., a twelfth terminal 222 of the second controller) other than the terminals described with reference to FIG. 5. The eleventh terminal 118 may be connected to a line connecting the first power source Vdd1 to the first switch 113. Therefore, the second controller 210 may monitor whether a current or a voltage is supplied from the first power source Vdd1 to the first pedal sensor 61.

The second controller 210 may include the third switch 215, the fourth switch 216, the fifth switch 217, the sixth switch 218, the power source monitoring unit 219, and the second processor 211. In various embodiments, the second controller 210 may further include the second motor driver 212, the second valve driver 213, the parking driver 214, and the second analog filter circuit (not illustrated). The second motor driver 212, the second valve driver 213, the parking driver 214, the second analog filter circuit, the third switch 215, the fourth switch 216, the fifth switch 217, the sixth switch 218, the power source monitoring unit 219, and the second processor 211 do not correspond to essential components of the second controller 210, and at least some of them may be omitted.

Descriptions of the third switch 215, the fourth switch 216, the fifth switch 217, and the sixth switch 218 can be replaced with the descriptions of the third switch, the fourth switch, the fifth switch, and the sixth switch described with reference to FIG. 5. According to the disclosed embodiment, the second controller 210 may include the twelfth terminal 222 connected to the specific terminal (i.e., the eleventh terminal 118) of the first controller 110. In other words, the twelfth terminal 222 may be connected to the eleventh terminal 118 of the first controller 110. Therefore, the second controller 210 may monitor whether the current or the voltage is supplied from the first power source Vdd1 to the first pedal sensor 61 according to the ON (closed) state of the first switch 113 and receive the first pedal signal from the first pedal sensor 61.

The power source monitoring unit 219 may include a first power source monitoring unit 219*a* and a second power source monitoring unit 219*b*.

The first power source monitoring unit 219*a* may detect whether the current or the voltage is supplied from the first power source Vdd1 to the first pedal sensor 61 and transmit a first detection signal related to this to the second processor 211. When the voltage supplied from the first power source Vdd1 is 0 V, the first power source monitoring unit 219*a* may generate the first detection signal indicating this and transmit the first detection signal to the second processor 211.

The second power source monitoring unit 219*b* may detect whether the current or the voltage is supplied to the first pedal sensor 61 and transmit a second detection signal related to this to the second processor 211. For example, when the ON signal for maintaining the ON (closed) state of the first switch 113 is not provided, the first switch 113 may be in an OFF (open) state. In this case, the power supply from the first power source Vdd1 to the first pedal sensor 61 may be blocked, and the voltage provided to the first pedal sensor 61 may be detected as 0 V. When the voltage provided to the first pedal sensor 61 is 0 V, the second power source monitoring unit 219*b* may generate the second detection signal indicating this and transmit the second detection signal to the second processor 211.

The second processor 211 may periodically receive the first detection signal and the second detection signal from the power source monitoring unit 219. The second processor 211 may determine whether the first controller 110 is in a normal state based on the received first detection signal and second detection signal.

Specifically, the second processor 211 may determine whether the power supply of the first controller 110 has failed and/or whether the first processor 111 has failed based on the received first detection signal and second detection signal. For example, when receiving the first detection signal indicating that the voltage supplied from the first power source Vdd1 is 0 V from the first power source monitoring unit 219*a*, the second processor 211 may determine a failure of the first power source Vdd1.

In this case, the second processor 211 may provide the third switch 215 with the ON signal for maintaining the ON (closed) state of the third switch 215. Therefore, the third switch 215 may maintain the ON (closed) state and allow the current to be supplied from the second power source Vdd2 to the first pedal sensor 61.

In various embodiments, when receiving the first detection signal indicating that the voltage supplied from the first power source Vdd1 is 5 V from the first power source monitoring unit 219*a* and receiving the second detection signal indicating that the voltage supplied from the first pedal sensor 61 is 0 V from the second power source monitoring unit 219*b*, the second processor 211 may determine a failure of the first processor 111 or a failure of the first switch 113.

In this case, the second processor 211 may provide the third switch 215 with the ON signal for maintaining the ON (closed) state of the third switch 215. Therefore, the third switch 215 may maintain the ON (closed) state and allow the current to be supplied from the second power source Vdd2 to the first pedal sensor 61. The second processor 211 may provide the fourth switch 216 with an ON signal for maintaining the ON (closed) state of the fourth switch 216. Therefore, the fourth switch 216 may maintain the ON (closed) state and allow the pedal signal to be provided from the first pedal sensor 61.

In various embodiments, when receiving the first detection signal indicating that the voltage supplied from the first power source Vdd1 is 0 V from the first power source monitoring unit 219*a* and receiving the second detection signal indicating that the voltage supplied from the first pedal sensor 61 is 0 V from the second power source monitoring unit 219*b*, the second processor 211 may determine failures of the first power source Vdd1 and the first processor 111.

In this case, the second processor 211 may provide the third switch 215 with the ON signal for maintaining the ON (closed) state of the third switch 215. Therefore, the third switch 215 may maintain the ON (closed) state and allow the current to be supplied from the second power source Vdd2 to the first pedal sensor 61. The second processor 211 may provide the fourth switch 216 with an ON signal for maintaining the ON (closed) state of the fourth switch 216. Therefore, the fourth switch 216 may maintain the ON (closed) state and allow the pedal signal to be provided from the first pedal sensor 61. In addition, the second processor 211 may provide the sixth switch 218 with the ON signal for maintaining the ON (closed) state of the sixth switch 218. Therefore, the sixth switch 218 may maintain the ON (closed) state and allow the pedal signal to be provided from the second pedal sensor 62.

The second processor 211 may control the braking operation of the vehicle 1 based on the first pedal signal received from the first pedal sensor 61 and the second pedal signal received from the second pedal sensor 62. The operation of the second processor 211 can be replaced with the description of the second processor described with reference to FIG. 5.

Figure 7:
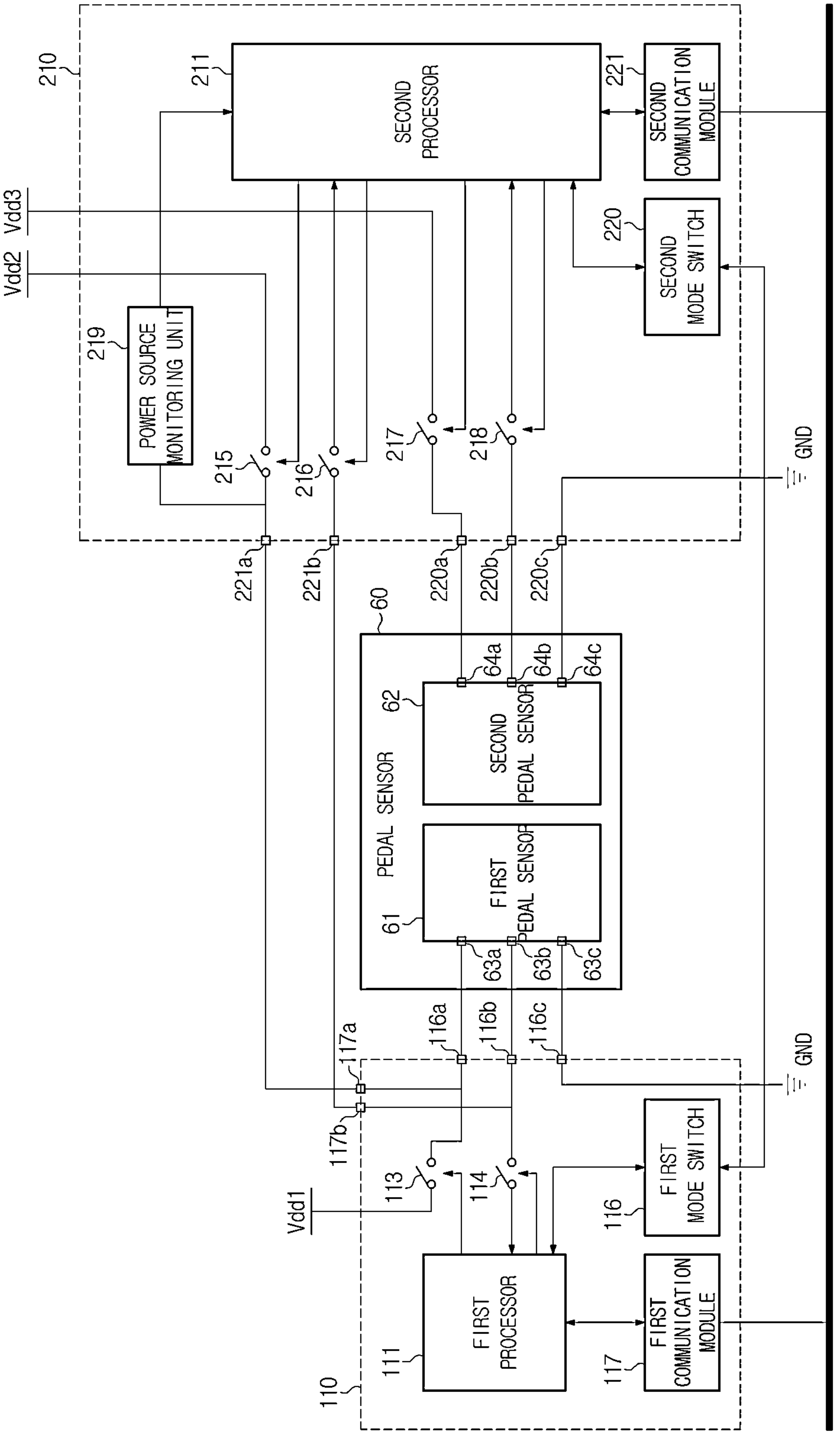
FIG. 7 illustrates one example of the connections between the first controller, the second controller, and the pedal sensor, which are included in the brake system according to various embodiments.

FIG. 7 illustrates one example of the connection between the first controller, the second controller, and the pedal sensor, which are included in the brake system according to various embodiments.

Referring to FIG. 7, the brake system may include the pedal sensor 60, the first controller 110, and the second controller 210.

Description of the pedal sensor 60 can be replaced with the description of the pedal sensor described with reference to FIG. 5.

The first controller 110 may include the first switch 113, the second switch 114, a first mode switch 116, a first communication module 117, and the first processor 111. In various embodiments, the first controller 110 may further include the first motor driver 112, the first valve driver 115, and the first analog filter circuit (not illustrated). The first motor driver 112, the first switch 113, the second switch 114, the first valve driver 115, the first analog filter circuit, the first mode switch 116, the first communication module 117, and the first processor 111 do not correspond to the essential components of the first controller 110, and at least some of them may be omitted.

Descriptions of the first switch 113, the second switch 114, and the first processor 111 can be replaced with the descriptions of the first switch, the second switch, and the first processor described with reference to FIG. 5.

As described above, the first controller 110 may include the first mode switch 116 and the first communication module 117.

The first mode switch 116 may provide a first switch toggle signal which toggles at a predetermined frequency to a second mode switch 220 of the second controller 210 and receive a second switch toggle signal from the second mode switch 220. The provided first switch toggle signal may be used to identify a normal state, failed state, or the like of the first controller 110.

The first communication module 117 may transmit data to the second controller 210 and receive data from the second controller 210 using the vehicle communication network. For example, the vehicle communication network may be controller area network (CAN) communication, but is not limited thereto, and various vehicle communication networks may be used to transmit or receive data between the first controller 110 and the second controller 210.

According to various embodiments, when it is determined that the first controller 110 does not normally control the first hydraulic pressure supplier 150 and the first hydraulic pressure controller 160 or at least one of the first hydraulic pressure supplier 150 or the first hydraulic pressure controller 160 does not normally operate, the first processor 111 may transmit failure data indicating a failure of the first controller 110 or a failure of at least one of the first hydraulic pressure supplier 150 or the first hydraulic pressure controller 160 to the second controller 210 through the first communication module 117.

The second controller 210 may include the third switch 215, the fourth switch 216, the fifth switch 217, the sixth switch 218, the power source monitoring unit 219, the second mode switch 220, a second communication module 221, and the second processor 211. In various embodiments, the second controller 210 may further include the second motor driver 212, the second valve driver 213, the parking driver 214, and the second analog filter circuit (not illustrated).

The second motor driver 212, the second valve driver 213, the parking driver 214, the second analog filter circuit, the third switch 215, the fourth switch 216, the fifth switch 217, the sixth switch 218, the power source monitoring unit 219, the second mode switch 220, the second communication module 221, and the second processor 211 do not correspond to the essential components of the second controller 210, and at least some of them may be omitted.

Descriptions of the third switch 215, the fourth switch 216, the fifth switch 217, the sixth switch 218, the power source monitoring unit 219, and the second processor 211 can be replaced with the descriptions of the third switch, the fourth switch, the fifth switch, the sixth switch, the power source monitoring unit, and the second processor described with reference to FIG. 5.

According to the disclosed embodiment, the second controller 210 may include the second mode switch 220 and the second communication module 221.

The second mode switch 220 may provide the second switch toggle signal which toggles at the predetermined frequency to the first mode switch 116 of the first controller and receive the first switch toggle signal from the first mode switch 116. The provided second switch toggle signal may be used to identify a normal state, failed state, or the like of the second controller 210.

The second communication module 221 may transmit data to the first controller 110 and receive data from the first controller 110 using the vehicle communication network. For example, the vehicle communication network may be CAN communication, but is not limited thereto, and various vehicle communication networks may be used to transmit or receive data between the first controller 110 and the second controller 210.

According to the disclosed embodiment, the second processor 211 may identify whether the first controller 110 is in a normal or failed state using the first switch toggle signal received from the first mode switch 116. For example, when the first switch toggle signal is toggled to a frequency other than the specified frequency or is stuck, the second processor 211 may determine that a failure of the first controller 110 has occurred.

When it is determined that the failure of the first controller 110 has occurred, the second processor 211 may determine whether power is supplied to the first pedal sensor 61 based on the detection signal received from the power source monitoring unit 219. Specifically, when it is determined that the voltage provided to the first pedal sensor 61 is 5 V based on the detection signal, the second processor 211 does not supply power to the first pedal sensor 61. The second processor 211 may provide the fourth switch 216 with an ON signal for maintaining an ON state of the fourth switch 216 so that the fourth switch 216 may maintain the ON state and receive the first pedal signal from the first pedal sensor 61.

When it is determined that the voltage provided to the first pedal sensor 61 is 0 V, the second processor 211 may provide the third switch 215 with an ON signal for maintaining an ON state of the third switch 215 in order to supply power to the first pedal sensor 61 so that the third switch 215 may maintain the ON state and supply the second current from the second power source Vdd2 to the first pedal sensor 61. Subsequently, the second processor 211 may provide the fourth switch 216 with the ON signal for maintaining the ON state of the fourth switch 216 so that the fourth switch 216 may maintain the ON state and receive the first pedal signal from the first pedal sensor 61. In addition, the second processor 211 may provide the sixth switch 218 with an ON signal for maintaining an ON state of the sixth switch 218 so that the sixth switch 218 may maintain the ON state and receive the second pedal signal from the second pedal sensor 62.

The second processor 211 may control the braking operation of the vehicle 1 based on the first pedal signal received from the first pedal sensor 61 and the second pedal signal received from the second pedal sensor 62.

According to various embodiments, the second processor 211 may receive failure data from the first controller 110 through the second communication module 221 and identify at least one of a failure of the first controller 110 or a failure of at least one of the first hydraulic pressure supplier 150 or the first hydraulic pressure controller 160 based on the received failure data. Specifically, the second processor 211 may receive the failure data indicating that the first controller 110 fails or at least one of the first hydraulic pressure supplier 150 or the first hydraulic pressure controller 160 fails from the first controller 110 through the second communication module 221. For example, the failure of the first controller 110 may include a case in which the first controller 110 may not normally control the first hydraulic pressure supplier 150 and the first hydraulic pressure controller 160, but is not limited thereto. The failure of at least one of the first hydraulic pressure supplier 150 or the first hydraulic pressure controller 160 may include a case in which at least one of the first hydraulic pressure supplier 150 or the first hydraulic pressure controller 160 may not normally operate, but is not limited thereto.

The second processor 211 receiving the failure data may determine whether power is supplied to the first pedal sensor 61 based on the detection signal received from the power source monitoring unit 219. When it is determined that no power is supplied from the first controller 110 to the first pedal sensor 61, the ON signal for maintaining the ON state of the third switch 215 may be provided to the third switch 215 so that the third switch 215 may maintain the ON state and supply the current from the second power source Vdd2 to the first pedal sensor 61. Subsequently, the second processor 211 may provide the fourth switch 216 with the ON signal for maintaining the ON state of the fourth switch 216 so that the fourth switch 216 may maintain the ON state and receive the first pedal signal from the first pedal sensor 61.

When it is determined that that power is supplied from the first controller 110 to the first pedal sensor 61, the second processor 211 may provide the fourth switch 216 with the ON signal for maintaining the ON state of the fourth switch 216 so that the fourth switch 216 may maintain the ON state and receive the first pedal signal from the first pedal sensor 61.

The second processor 211 may control the braking operation of the vehicle 1 based on the first pedal signal received from the first pedal sensor 61 and the second pedal signal received from the second pedal sensor 62.

Figure 8:
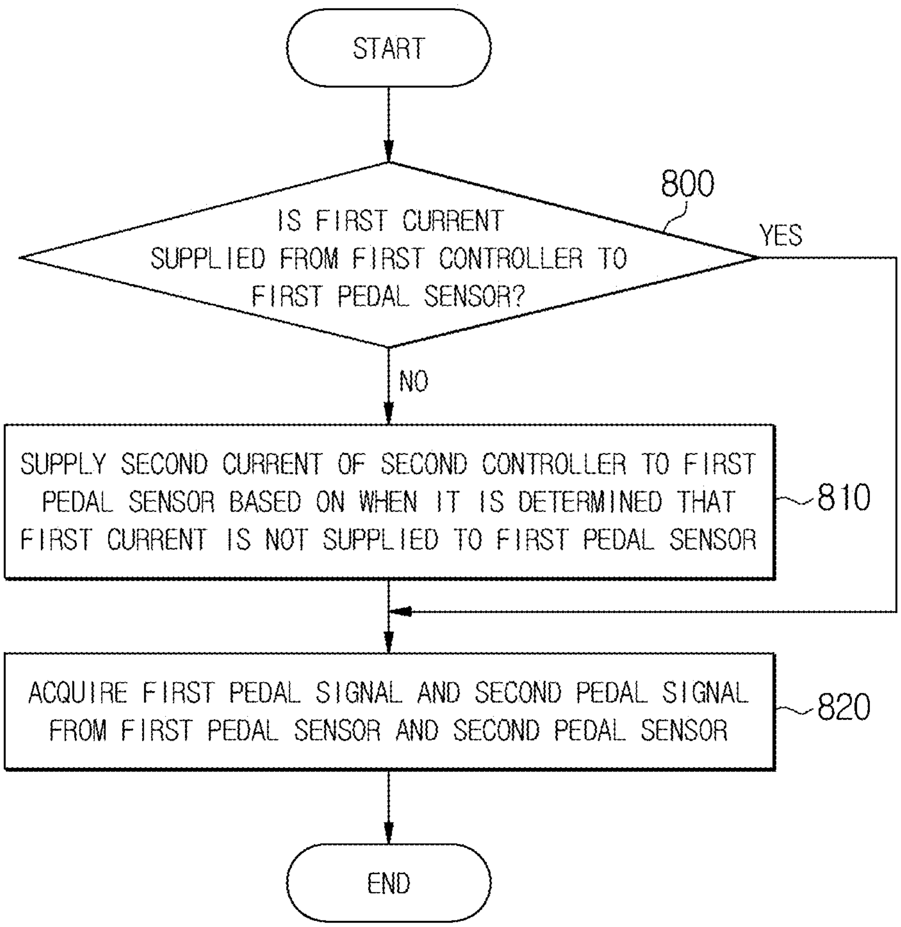
FIG. 8 illustrates a braking control operation of the second controller according to one embodiment.

FIG. 8 illustrates a braking control operation of the second controller according to one embodiment.

Referring to FIG. 8, when the second controller 210 determines whether the first current is supplied from the first controller 110 to the first pedal sensor 61 (800) and it is determined that the first current is not supplied to the first pedal sensor 61, the second controller 210 may supply the second current of the second controller 210 to the first pedal sensor 61 based on when it is determined that the first current is not supplied (810).

Specifically, the second processor 211 of the second controller 210 may receive the detection signal from the power source monitoring unit 219 and determine whether the power is supplied to the first pedal sensor 61 based on the received detection signal. When the detection signal includes information indicating that the voltage supplied from the first power source Vdd1 of the first controller 110 to the first pedal sensor 61 is 0 V, the second processor 211 may determine that it is in a state in which no first current is supplied to the first pedal sensor 61. In this case, the second processor 211 may determine a failure of the first controller 110 or a failure of the first power source Vdd1. When the failure of the first controller 110 or the failure of the first power source Vdd1 is determined, the second processor 211 may provide the third switch 215 with the ON signal for maintaining the ON state of the third switch 215 to supply power to the first pedal sensor 61 so that the third switch 215 may maintain the ON state and supply the second current from the second power source Vdd2 to the first pedal sensor 61.

After performing operation 810 or when the first current is supplied to the first pedal sensor 61 in operation 800, the second controller 210 may acquire the first pedal signal and the second pedal signal from the first pedal sensor 61 and the second pedal sensor 62 (820). Specifically, the second processor 211 of the second controller 210 may provide the fourth switch 216 with the ON signal for maintaining the ON state of the fourth switch 216 so that the fourth switch 216 may maintain the ON state and receive the first pedal signal from the first pedal sensor 61. Subsequently, the second processor 211 may provide the sixth switch 218 with the ON signal for maintaining the ON state of the sixth switch 218 so that the sixth switch 218 may maintain the ON state and receive the second pedal signal from the second pedal sensor 62.

The operation of the second controller 210 for controlling the vehicle 1 based on the first pedal signal provided from the first pedal sensor 61 and the second pedal signal provided from the second pedal sensor 62 will be described in more detail with reference to FIG. 9.

Figure 9:
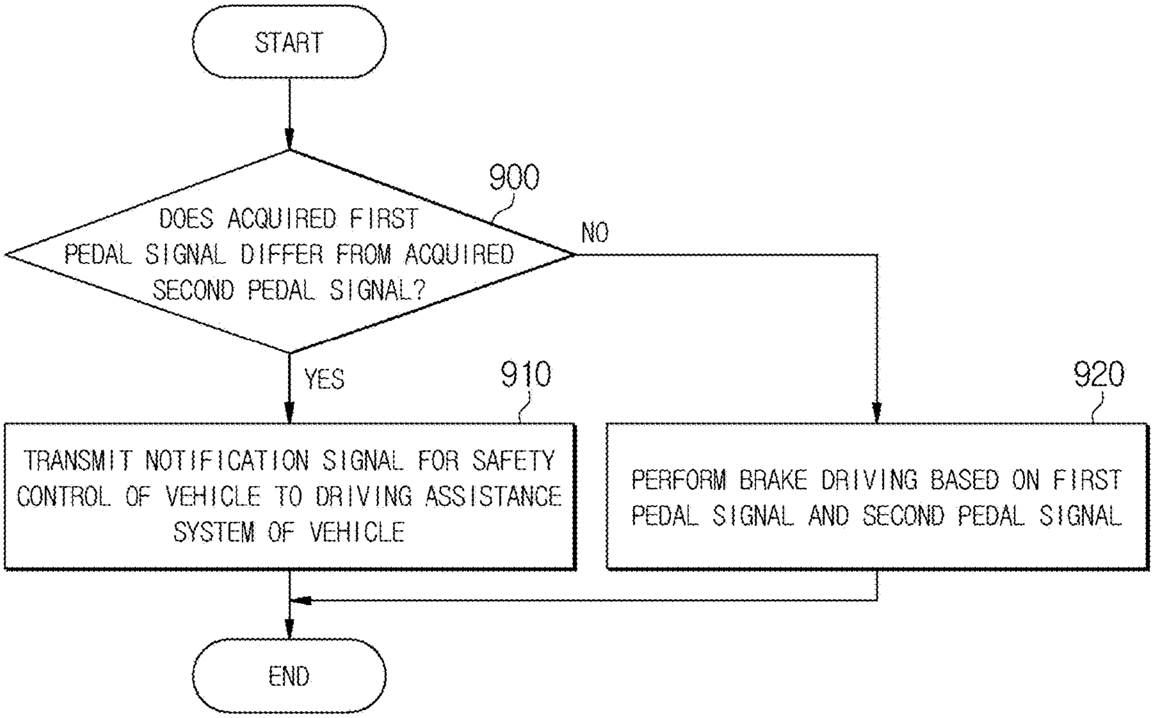
FIG. 9 illustrates an operation of the second controller for controlling a vehicle based on a first pedal signal and a second pedal signal according to one embodiment.

FIG. 9 illustrates an operation of the second controller for controlling a vehicle based on a first pedal signal and a second pedal signal according to one embodiment.

Referring to FIG. 9, the second controller 210 may determine whether the acquired first pedal signal differs from the acquired second pedal signal (900) and transmit the notification signal for safety control of the vehicle 1 to the driving assistance system of the vehicle 1 when it is determined that the two signals differ from each other (910).

Specifically, the second processor 211 of the second controller 210 may determine whether the moving distance and/or moving speed of the brake pedal 50 which may be calculated by the first pedal signal differ from the moving distance and/or moving speed of the brake pedal 50 which may be calculated by the second pedal signal. When the two values differ from each other, the second processor 211 may determine that a normal braking operation is impossible and transmit the notification signal for safety control of the vehicle 1 to the driving assistance system so that the driving assistance system may perform a vehicle safety control operation.

When it is determined that the first pedal signal matches the second pedal signal, the second controller 210 may perform brake driving based on the first pedal signal and the second pedal signal (920). Specifically, when the two values are the same, the second processor 211 of the second controller 210 may determine that the normal braking operation is possible to determine a pedal force of the brake pedal according to the driver's brake intention based on at least one of the first pedal signal or the second pedal signal and perform brake driving based on the determined pedal force of the brake pedal.

In various embodiments, since the first pedal signal provided from the first pedal sensor 61 includes state information indicating a normal state or failed state of the first pedal sensor 61, the second processor 211 may receive the first pedal signal including the state information indicating the failed state of the first pedal sensor 61 from the first pedal sensor 61. In this case, the second processor 211 may perform the brake driving using the second pedal signal provided from the second pedal sensor 62 or transmit the notification signal for safety control of the vehicle 1 to the driving assistance system so that the driving assistance system may perform the vehicle safety control operation.

According to various embodiments, the second processor 211 may determine whether at least one of the first pedal signal or the second pedal signal is a normal signal or a fault signal using various sensors provided in the vehicle 1. For example, various sensors may include a vehicle speed sensor for detecting a speed of the vehicle 1, an acceleration sensor for detecting longitudinal and lateral accelerations of the vehicle 1, a gyro sensor for detecting a yaw rate, roll rate, and pitch rate of the vehicle 1, and/or a wheel sensor for detecting a wheel speed and wheel direction of the vehicle 1, but is not limited thereto, and may include sensors for measuring measured values which may be used to calculate the moving distance and/or moving speed of the brake pedal 50.

Specifically, the second processor 211 may calculate the moving distance or moving speed of the brake pedal 50 using measured values measured by the wheel sensor, the yaw sensor, the vehicle speed sensor, the acceleration sensor, and/or the gyro sensor. Subsequently, the second processor 211 may calculate the moving distance or moving speed of the brake pedal 50 based on the first pedal signal and calculate the moving distance or moving speed of the brake pedal 50 based on the second pedal signal.

The second processor 211 may calculate a first difference value between the moving distance or moving speed calculated based on the measured values of the sensors and the moving distance or moving speed calculated based on the first pedal signal and a second difference value between the moving distance or moving speed calculated based on the measured values of the sensors and the moving distance or moving speed calculated based on the second pedal signal.

The second processor 211 may determine whether each of the first difference value and the second difference value is smaller than a preset critical value and recognize that both of the first pedal sensor 61 and the second pedal sensor 62 are in a normal state when the first difference value and the second difference value are each smaller than the critical value. When it is determined that both of the first pedal sensor 61 and the second pedal sensor 62 are in a normal state, the second processor 211 may control the brake operation based on the first pedal signal and the second pedal signal.

When the first difference value and the second difference value are each greater than or equal to the critical value, the second processor 211 may recognize that both of the first pedal sensor 61 and the second pedal sensor 62 are in a failed state. When it is determined that both of the first pedal sensor 61 and the second pedal sensor 62 are in a failed state, the second processor 211 may transmit the notification signal for safety control of the vehicle 1 to the driving assistance system.

When any one of the first difference value or the second difference value is larger than or equal to the critical value, the second processor 211 may recognize that any one of the first pedal sensor 61 or the second pedal sensor 62 is in a failed state. When it is determined that any one of the first pedal sensor 61 or the second pedal sensor 62 is in a failed state, the second processor 211 may control the brake operation based on the first pedal signal which has been determined to be in a normal state. For example, when it is determined that the first pedal signal is a fault signal, the second processor 211 may control the brake driving based on the second pedal signal.

As is apparent from the above description, an auxiliary supply device of a brake apparatus, which is used for a failure of a hydraulic pressure supply device of the brake apparatus, can stably acquire a plurality of pieces of detection information from a plurality of sensors.

In addition, according to the disclosed embodiment, the auxiliary supply device can perform safety control of a vehicle by detecting failures of the hydraulic pressure supply device and each of the plurality of sensors.

Meanwhile, disclosed embodiments may be implemented in the form of a recording medium in which commands executable by a computer are stored. The commands may be stored in the form of program code, and when executed by a processor, program modules are generated to perform operations of the disclosed embodiments. The recording medium may be implemented as a computer-readable recording medium.

The computer-readable recording medium includes any type of recording media in which commands which may be decoded by a computer are stored. For example, there may be a ROM, a RAM, a magnetic tape, a magnetic disk, a flash memory, an optical data storage device, or the like.

A device-readable storage medium may be provided in the form of a non-transitory storage medium. Here, “non-transitory storage medium” is a tangible device and only means not including a signal (e.g., electromagnetic waves), and this term does not distinguish between cases in which data is stored semi-permanently and temporarily in the storage medium. For example, “non-temporary storage medium” may include a buffer in which data is temporarily stored.

As described above, the disclosed embodiments have been described with reference to the accompanying drawings. Those skilled in the art to which the present disclosure pertains will understand that the present disclosure can be carried out in the form different from those of the disclosed embodiments even without changing the technical spirit or essential features of the present disclosure. The disclosed embodiments are illustrative and should not be construed as being limited.

What is claimed is:

1. A brake apparatus comprising:

a first hydraulic pressure supplier connected to one or more of wheel cylinders of a vehicle;

a second hydraulic pressure supplier connected to one or more of the wheel cylinders;

a first controller configured to control the first hydraulic pressure supplier to supply a first hydraulic pressure to one or more of the wheel cylinders; and a second controller configured to control the second hydraulic pressure supplier to supply a second hydraulic pressure to one or more of the wheel cylinders, wherein:

the first controller is configured to connect a first power source of the vehicle with a first pedal sensor of the vehicle, the second controller is configured to connect a second power source of the vehicle with the first pedal sensor and a second pedal sensor of the vehicle, and monitor a first current supplied from the first power source to the first pedal sensor, and the second controller is configured to, in response to detecting that the first current from the first power source is not supplied to the first pedal sensor, supply a second current of the second power source to the first pedal sensor and receive a first pedal signal and a second pedal signal from the first pedal sensor and the second pedal sensor, respectively, wherein the second controller includes a switch configured to selectively allow or block the second current of the second power source to be supplied to the first pedal sensor, and the second controller is configured to control the switch in response to a signal indicating whether the first current from the first power source is supplied to the first pedal sensor.

2. The brake apparatus of claim 1, wherein the first controller includes a first switch configured to selectively allow or block the first current of the first power source to be supplied to the first pedal sensor, a second switch configured to selectively allow or block the first pedal signal to be received from the first pedal sensor, and a first processor configured to control at least one of the first switch or the second switch.

3. The brake apparatus of claim 2, wherein the switch is a third switch, a fourth switch configured to selectively allow or block the first pedal signal to be received from the first pedal sensor, and a second processor configured to control at least one of the third switch or the fourth switch.

4. The brake apparatus of claim 3, wherein:

the third switch is connected to a power source terminal of the first pedal sensor in series between the first controller and the second controller, and the fourth switch is connected to a signal terminal of the first pedal sensor in series between the first controller and the second controller.

5. The brake apparatus of claim 3, wherein the second processor is configured to, in response to the signal indicating that the first current from the first power source is not supplied to the first pedal sensor, control the third switch such that the second current is supplied from the second power source to the first pedal sensor.

6. The brake apparatus of claim 5, wherein the second processor is configured to control the fourth switch to selectively allow the first pedal signal to be received from the first pedal sensor.

7. The brake apparatus of claim 5, wherein the second controller includes: a first power source monitor configured to monitor whether the first current is supplied from the first power source; and a second power source monitor configured to monitor whether the first current is supplied to the first pedal sensor.

8. The brake apparatus of claim 7, wherein the second processor is configured to, in response to a monitoring result that the first current is not supplied from the first power source to the first pedal sensor, determine that the first power source fails.

9. The brake apparatus of claim 8, wherein the second processor is configured to, in response to a monitoring result that the first current is supplied from the first power source and the first current is not supplied to the first pedal sensor, determine that the first processor fails.

10. The brake apparatus of claim 4, wherein:

the first controller further includes a first mode switch configured to transmit a frequency toggle signal configured to toggle at a predetermined frequency, the second controller further includes a second mode switch configured to receive the frequency toggle signal, and the second processor is configured to, when the frequency toggle signal transmitted from the first mode switch to the second mode switch has a different frequency from the predetermined frequency, determine that the first controller fails.

11. The brake apparatus of claim 4, wherein:

the first controller further includes a first communicator connected to a vehicle communication network, the second controller further includes a second communicator connected to the vehicle communication network, and the second processor is configured to, in response to reception of data indicating a failure of the first controller from the first controller through the second communicator, determine the failure of the first controller.

12. The brake apparatus of claim 3, wherein the second processor is configured to determine whether at least one of the first pedal sensor or the second pedal sensor fails based on the first pedal signal and the second pedal signal.

13. The brake apparatus of claim 12, wherein the second processor is configured to, when the first pedal signal is different from the second pedal signal, determine that at least one of the first pedal sensor or the second pedal sensor fails.

14. The brake apparatus of claim 12, wherein the second processor is configured to:

determine that the first pedal sensor fails when the first pedal signal includes information indicating a failed state of the first pedal sensor; and determine that the second pedal sensor fails when the second pedal signal includes information indicating a failed state of the second pedal sensor.

15. The brake apparatus of claim 12, wherein the vehicle further includes a plurality of sensors, the plurality of sensors include one or more of a vehicle speed sensor configured to detect a longitudinal speed of the vehicle, an acceleration sensor configured to detect longitudinal and transverse accelerations of the vehicle, a gyro sensor configured to detect a yaw rate, a roll rate, and a pitch rate of the vehicle, or a wheel sensor configured to detect a wheel speed and a wheel direction of the vehicle, and the second processor is configured to determine that any one of the first pedal sensor or the second pedal sensor is normal based on detected values detected by the plurality of sensors.

16. The brake apparatus of claim 12, wherein the second processor is configured to, when any one of the first pedal sensor or the second pedal sensor fails, transmit a notification signal for safety control of the vehicle to a driving assistance system of the vehicle so that the driving assistance system of the vehicle safely controls the vehicle.

17. The brake apparatus of claim 12, wherein the second processor is configured to, when one of the first pedal sensor or the second pedal sensor fails, control a brake operation of the vehicle based on a pedal signal provided from another of the first pedal sensor or the second pedal sensor which does not fail.

18. A method of controlling a brake apparatus, the method comprising:

monitoring whether a first current from a first power source of a vehicle is supplied to a first pedal sensor to which a first controller is connected;

when the first current from the first power source is not supplied to the first pedal sensor, supplying a second current of a second power source of the vehicle from the second power source and a second controller connected to a second pedal sensor to the first pedal sensor;

receiving a first pedal signal from the first pedal sensor; and receiving a second pedal signal from the second pedal sensor, wherein supplying the second current comprises controlling, by the second controller, a switch configured to selectively allow or block the second current of the second power source to be supplied to the first pedal sensor in response to a signal indicating whether the first current from the first power source is supplied to the first pedal sensor.

19. The method of claim 18, comprising:

determining whether the received first pedal signal is different from the received second pedal signal;

when the first pedal signal is different from the second pedal signal, transmitting a notification signal for safety control of the vehicle to a driving assistance system of the vehicle when the first pedal signal is different from the second pedal signal; and when the first pedal signal is identical to the second pedal signal, performing a brake operation of the vehicle based on the first pedal signal and the second pedal signal.

* * * * *